US007014743B2

(12) United States Patent
Zhou et al.

(10) Patent No.: US 7,014,743 B2
(45) Date of Patent: Mar. 21, 2006

(54) METHODS FOR ASSEMBLY AND SORTING OF NANOSTRUCTURE-CONTAINING MATERIALS AND RELATED ARTICLES

(75) Inventors: Otto Z. Zhou, Chapel Hill, NC (US); Jie Tang, Chapel Hill, NC (US); Huaizhi Geng, Carrboro, NC (US); Lu-Chang Qin, Chapel Hill, NC (US); Jian Zhang, Carrboro, NC (US); Guang Yang, Carrboro, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 10/730,068

(22) Filed: Dec. 9, 2003

(65) Prior Publication Data

US 2004/0173378 A1    Sep. 9, 2004

Related U.S. Application Data

(60) Provisional application No. 60/461,401, filed on Apr. 10, 2003, provisional application No. 60/431,719, filed on Dec. 9, 2002.

(51) Int. Cl.
*B01D 57/02* (2006.01)
(52) U.S. Cl. ................................. 204/547; 977/DIG. 1
(58) Field of Classification Search ................. 204/547
See application file for complete search history.

(56) References Cited

U.S. PATENT DOCUMENTS 6,277,318 B1    8/2001    Bower et al.
6,280,697 B1    8/2001    Zhou et al.
6,334,939 B1    1/2002    Zhou et al.
6,401,526 B1    6/2002    Dai et al.
6,422,450 B1    7/2002    Zhou et al.
6,457,350 B1    10/2002   Mitchell
6,528,785 B1    3/2003    Nakayama et al.
6,553,096 B1    4/2003    Zhou et al.
6,616,497 B1    9/2003    Choi et al.
6,630,772 B1    10/2003   Bower et al.

(Continued)

OTHER PUBLICATIONS

R. Stevens et al., "Improved fabrication approach for carbon nanotube probe devices", *Appl. Phys. Lett.*, vol. 77, No. 21, Nov. 20, 2000, pp. 3453-3455.

(Continued)

*Primary Examiner*—Roy King
*Assistant Examiner*—William T. Leader
(74) *Attorney, Agent, or Firm*—Jenkins, Wilson, Taylor & Runt, P.A.

(57) ABSTRACT

A method for depositing a nanostructure-containing material onto an object or substrate includes one or more of the following: (1) forming a solution or suspension of nanostructure-containing material, (2) selectively adding "chargers" to the solution, (3) immersing electrodes in the solution, the substrate or object upon which the nanostructure material is to be deposited acting as one of the electrodes, (4) applying a direct and/or alternating current electrical field between the two electrodes for a certain period of time thereby causing the nanostructure materials in the solution to migrate toward and attach themselves to the substrate electrode, and (5) subsequent optional processing of the coated substrate. Associated objects and devices are also provided. A method for separating nanostructures based on their properties and/or geometry is also described.

8 Claims, 20 Drawing Sheets

U.S. PATENT DOCUMENTS

| | | | |
|---|---|---|---|
| 6,787,122 | B1 | 9/2004 | Zhou |
| 6,875,329 | B1 * | 4/2005 | Washizu et al. ............ 204/547 |
| 2002/0094064 | A1 | 7/2002 | Zhou et al. |
| 2002/0140336 | A1 | 10/2002 | Stoner et al. |
| 2002/0193040 | A1 | 12/2002 | Zhou |
| 2003/0111946 | A1 | 6/2003 | Talin et al. |
| 2003/0180472 | A1 | 9/2003 | Zhou et al. |
| 2004/0038251 | A1 * | 2/2004 | Smalley et al. ................ 435/6 |
| 2004/0055892 | A1 | 3/2004 | Oh et al. |

OTHER PUBLICATIONS

J. Hafner et al., "Growth of nanotubes for probe microscopy tips", *Nature*, vol. 398, Apr. 29, 1999, pp. 761-762.

H. Dai et al., "Nanotubes as nanoprobes in scanning probe micrscopy", *Nature*, vol. 384, Nov. 14, 1996, pp. 147-150.

Abstract of JP2002301700, "Manufacturing Method for Nanotube Probe". http://espacenet.com/textdoc?DB=PAJ&IDX=JP2002301700.

* cited by examiner 910    920    10 μm 910
920
10 μm

METHODS FOR ASSEMBLY AND SORTING OF NANOSTRUCTURE-CONTAINING MATERIALS AND RELATED ARTICLES

This application claims priority pursuant to 35 U.S.C. §119, from Provisional U.S. Patent Application No. 60/431,719 filed on Dec. 9, 2002, the entire contents of which is incorporated herein by reference. This application also claims priority pursuant to 35 U.S.C. §119, from Provisional U.S. Patent Application No. 60/461,401 filed on Apr. 10, 2003, the entire contents of which is incorporated herein by reference

STATEMENT REGARDING FEDERALLY SPONSORED RESEARCH OR DEVELOPMENT

At least some aspects of this invention were made with Government support under contract nos. N00014-98-1-0597 and NAG-1-01061. The Government may have certain rights in this invention.

FIELD OF THE INVENTION

The present invention relates to methods of depositing a nanostructure or nanotube-containing material onto an object, methods of sorting nanostructure or nanotube-containing materials, methods of forming articles from nanostructure or nanotube-containing materials, methods for sorting nanostructure or nanotube-containing materials, and associated structures and devices.

BACKGROUND

In the description of the background that follows reference is made to certain structures and methods, however, such references should not necessarily be construed as an admission that these structures and methods qualify as prior art under the applicable statutory provisions. Applicants reserve the right to demonstrate that any of the referenced subject matter does not constitute prior art with regard to the present disclosure.

The term "nanostructure" material is used by those familiar with the art to designate materials including nanoparticles such as $C_{60}$ fullerenes, fullerene-type concentric graphitic particles, metal, compound semiconductors such as CdSe, InP; nanowires/nanorods such as Si, Ge, $SiO_x$, $GeO_x$, or nanotubes composed of either single or multiple elements such as carbon, $B_xN_y$, $C_xB_yN_z$, $MoS_2$, and $WS_2$. One of the common features of nanostructure materials is their basic building blocks. A single nanoparticle or a carbon nanotube has a dimension that is less than 500 nm at least in one direction. These types of materials have been shown to exhibit certain properties that have raised interest in a variety of applications and processes.

U.S. Pat. Nos. 6,280,697 and 6,422,450 to Zhou et al. (both entitled "Nanotube-Based High Energy Material and Method"), the disclosures of which are incorporated herein by reference, in their entirety, disclose the fabrication of carbon-based nanotube materials and their use as a battery electrode material.

U.S. Pat. No. 6,630,772 (Ser. No. 09/296,572 entitled "Device Comprising Carbon Nanotube Field Emitter Structure and Process for Forming Device") the disclosure of which is incorporated herein by reference, in its entirety, discloses a carbon nanotube-based electron emitter structure.

U.S. Pat. No. 6,630,772 to Bower et al. (entitled "Device Comprising Thin Film Carbon Nanotube Electron Field Emitter Structure"), the disclosure of which is incorporated herein by reference, in its entirety, discloses a carbon-nanotube field emitter structure having a high emitted current density.

U.S. Pat. No. 6,277,318 to Bower et al. (entitled "Method for Fabrication of Patterned Carbon Nanotube Films"), the disclosure of which is incorporated herein by reference, in its entirety, discloses a method of fabricating adherent, patterned carbon nanotube films onto a substrate.

U.S. Pat. No. 6,334,939 (entitled "Nanostructure-Based High Energy Material and Method"), the disclosure of which is incorporated herein by reference, in its entirety, discloses a nanostructure alloy with alkali metal as one of the components. Such materials are described as being useful in certain battery applications.

U.S. Pat. No. 6,553,096 to Zhou et al. (entitled "X-Ray Generating Mechanism Using Electron Field Emission Cathode"), the disclosure of which is incorporated herein by reference, in its entirety, discloses an X-ray generating device incorporating a nanostructure-containing material.

U.S. Published Patent Application No. US 2002/0140336 (entitled "Coated Electrode With Enhanced Electron Emission And Ignition Characteristics"), the disclosure of which is incorporated herein by reference, in its entirety, discloses an electrode including a first electrode material, an adhesion-promoter, and a carbon nanotube-containing material disposed on at least a portion of the adhesion promoting layer, as well as associated devices incorporating such an electrode.

U.S. Patent Publication No. US 2002/0193040 (entitled "Method of Making Nanotube-Based Material With Enhanced Field Emission"), the disclosure of which is incorporated herein by reference, in its entirety, discloses a technique for introducing a foreign species into the nanotube-based material in order to improve the properties thereof.

U.S. Patent Publication No. US 2002/0094064 (entitled "Large-Area Individually Addressable Multi-Beam X-Ray System and Method of Forming Same"), the disclosure of which is incorporated herein by reference, in its entirety, discloses a structure to generate x-rays having a plurality of stationary and individually electrically addressable field emissive electron sources, such as carbon nanotubes.

U.S. Patent Publication No. US 2003/0180472 (entitled "Method for Assembling Nano-objects"), the disclosure of which is incorporated herein by reference, in its entirety, discloses a technique for the self assembly of a macroscopic structure with preformed nano-objects, which may be processed to render a desired aspect ratio and/or chemical functionality.

As evidenced by the above, nanostructure materials, especially those such as carbon nanotubes and other nano-objects having a large aspect ratio (i.e.—a length which is substantially larger than its diameter) possess promising properties that make them attractive for a variety of applications, such as lighting elements, field emission devices such as flat panel displays, gas discharge tubes for over voltage protection, x-ray generating devices, small conduction wires, sensors, actuators and high resolution probes such as those used in scanning microscopes.

The effective incorporation of such materials into such devices has been hindered by difficulties encountered in the processing of such materials. For instance, nanostructured materials can be formed by techniques such as laser ablation, and arc discharge methods, solution synthesis, chemical etching, molecular beam epitaxy, chemical vapor deposition, laser ablation, etc. However, processing techniques to assemble these nanostructure materials have posed certain difficulties.

Post-formation methods such as screen printing and spraying have been utilized to deposit pre-formed nano-objects such as carbon nanotubes on a substrate. However, such techniques pose certain drawbacks. For instance, screen printing requires the use of binder materials as well as an activation step. Spraying can be inefficient and is not practical for large-scale fabrication. Moreover, these techniques typically result in randomly distributed nanostructure materials on the substrate.

Carbon nanotubes have been grown directly upon substrates by use of chemical vapor deposition (CVD) techniques. See, e.g.—J. Hafner et al., Nature, Vol. 398, pg. 761, 1999 and U.S. Pat. Nos. 6,457,350 and 6,401,526. One potential application of this technique is the formation of conducting wires made from nanostructure materials, such as carbon nanotubes and electrical circuitry. The CVD process can be used to form the conducting wires which are attached to electrodes at specific locations using CVD techniques to form the conducting wires. However, such techniques require relatively high temperatures (e.g.—600–1,000° C.) as well as reactive environments, and the use of catalysts in order to effectively grow the nanotubes. The requirement for such harsh environmental conditions severely limits the types of substrate materials which can be utilized. In addition, the CVD technique often results in mutli-wall carbon nanotubes. These mutli-wall carbon nanotubes generally do not have the same level of structural perfection and thus have inferior electronic emission properties when compared with single-walled carbon nanotubes. Also, direct growth of nanotubes onto the substrate by such techniques makes it difficult to control the length, orientation and number of the nanotubes deposited thereby.

Other techniques have involved efforts to precisely control the deposition of individual or small groups of nano-objects, such as carbon nanotubes, onto a substrate, such as sharp tips or projections. See, e.g.—Dai, Nature, Vol. 384, pgs. 147–150 (1996); and R. Stevens et al., Appl. Phys. Lett., Vol. 77, pg. 3453. However, such techniques are painstaking and time-consuming, and do not lend themselves to efficient large-scale production, or batch processing. For example, U.S. Pat. No. 6,528,785 describes a process by which plate-like electrodes are placed in an electrophoretic solution and nanotubes are deposited on at least one of the electrodes. The electrode(s) is withdrawn from the solution and nanotubes deposited thereon are transferred to a sharp tip in a further processing step. The nanotube(s) is then "fusion welded" to the tip by yet another processing step which may include the deposition of a coating material over at least the portion of the nanotube attached the sharp tip. The process is slow and lacks of control of the orientation. The tips formed usually comprise one carbon nanotube (CNT) per tip. The interfacial bonding between the tip and CNT tends to be weak. It is difficult to fabricate many tips at one time. This process is undesirably complicated and tedious, and thus is impractical for commercial scale production.

Another consideration in the art is that in the construction of electrical devices using nanostructured materials, it is often necessary to have materials with the same properties, such as their electronic properties. This has not been achieved. For example, single wall carbon nanotubes materials synthesized by the laser ablation methods contain materials that are both metallic and semiconducting by nature. Currently, there is no effective method to separate the nanotubes based on their properties. For instance, separation of metallic and semiconducting nanotubes is necessary for many device applications.

SUMMARY

Techniques, and their associated articles, have been developed which permit efficient and effective assembly of nanostructure-containing materials under relatively mild conditions, separation of nanostructure-containing materials based on their properties wherein such methods are suitable for batch-scale processing.

According to one aspect, a method of attaching a nanostructure-containing material onto a sharp tip of an object, the method comprising: (i) forming a suspension of nanostructure-containing material in a liquid medium; (ii) immersing at least one electrode in the suspension; (iii) placing the sharp tip into the suspension; and (iv) applying a direct or alternating current to the immersed electrode and the sharp tip and causing at least a portion of the nanostructure-containing material in the suspension to become attached to the object proximate an apex of the sharp tip.

According to another aspect, a wire is provided having a diameter of 0.5 nm–100 $\mu$m and a length of 10 nanometers (nm) to greater than 1 centimeter (cm) comprising nanostructure-containing material.

According to another aspect, an object is provided having a sharp tip coated with a single carbon nanotube, carbon nanotube bundle, or nanowire, the object comprising at least one of: a point electron field emission source, a probe of an atomic force microscope (AFM), a probe of a scanning tunneling microscope (STM), an electron source of a transmission electron microscope (TEM), an electron source of a scanning electron microscope (SEM), a probe of a magnetic force microscope (MFM), or a profilometer.

According to one aspect, a method of attaching a nanostructure-containing material onto a sharp tip of an object is provided comprising (i) forming a suspension of nanostructure-containing material in a liquid medium, (ii) immersing at least one electrode in the suspension, (iii) placing the sharp tip into the suspension, and (iv) applying a direct or alternating current to the immersed electrode and the sharp tip and causing at least a portion of the nanostructure-containing material in the suspension to become attached to the object proximate an apex of the sharp tip.

According to another aspect, a device is provided comprising a generally conical sharp tip having a cone axis, and a fibril comprising nanostructure-containing material attached to the sharp tip and generally aligned along the cone axis of the sharp tip, the fibril having a diameter of 0.5 nm to 10 $\mu$m.

According to yet another aspect, a method of making an electrical connection between a plurality of components is provided comprising (i) forming a suspension of nanostructure-containing material in a liquid medium, (ii) bringing the suspension into contact with the components and (iii) applying a direct or alternating current to the components thereby establishing an electrical field therebetween causing a wire to be formed from the nanostructure-containing material connecting the components.

According to another aspect, an arrangement is provided comprising a first component; a second component; and a first wire comprising nanostructure-containing material, the wire attached to both the first and second components and providing an electrical connection therebetween.

According to yet another aspect, a method of separating groups of nanostructure-containing materials is provided comprising (i) forming a mixture comprising the groups of nanostructure-containing materials to be separated and a liquid medium, (ii) introducing a plurality of electrodes into the mixture; (iii) establishing an asymmetrical electrical field within the mixture, (iv) polarizing the groups of nanostructure-containing materials in the mixture, thereby causing at least a first group to migrate to a first electrode and causing a second group to migrate to a second electrode, and (v) recovering at least the first group from the liquid medium at the first electrode.

According to a further aspect, a method of separating a first group of particles from a second group of particles contained in a mixture, at least one of the first and second groups of particles comprising a nanostructure-containing material, is provided comprising (i) forming an arrangement of electrodes, (ii) applying an alternating current power source to the arrangement, (iii) bringing the mixture into proximity with the arrangement, (iv) polarizing the first group of particles differently than the second group of particles, (v) separating the first group of particles from the second group of particles based on differences in polarity, and (vi) recovering at least one of the first or second group of particles.

As used herein, the term "nanostructure-containing material" means materials which are composed, at least in part, from nanoparticles such as $C_{60}$ fullerenes, fullerene-type concentric graphitic particles, metal, compound semiconductors such as CdSe, InP; nanowires/nanorods such as Si, Ge, $SiO_x$, $GeO_x$, or nanotubes composed of either single or multiple elements such as carbon, $B_xN_y$, $C_xB_yN_z$, $MoS_2$, and $WS_2$.

The term "generally conical" encompasses geometries which are mainly conical in nature, but may include various structural deviations from purely conical shapes. The extent of these variations are those typically observed in the formation of sharp tips for uses such as in the formation of probes for atomic force microscopes, scanning probe microscopes, magnetic force microscopes, profilometers, transmission electron microscopes, scanning electron microscopes, and the like, utilizing conventional techniques for forming such sharp tips.

The term "generally aligned" encompasses differences in alignment on the order of up to 15 degrees, or slightly more.

The term "fibril" encompasses a single nanostructure particle, nanowire or nanotube; a plurality of such particles, nanowires or nanotubes; a single bundle of these objects; or a plurality of bundles of the same.

DETAILED DESCRIPTION

Figure 1:
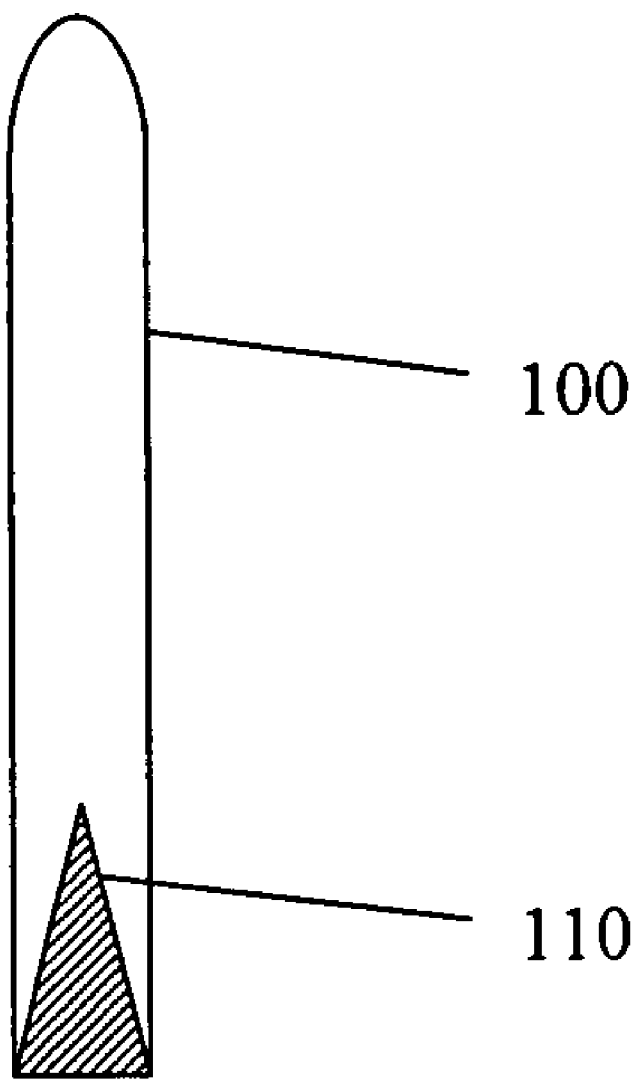
FIG. 1 is a schematic illustration of a nanostructure-containing material.

Methods performed consistent with the principles of the present invention, and according to illustrative embodiments, along with corresponding structures and devices, are described as follows.

Generally, a method performed according to the principles of the present invention can include a combination of some or all of the following steps: (1) forming a suitable nanostructure-containing material; (2) purifying the nanostructure-containing material; (3) functionalizing the nonstructural-containing material; (4) forming a solution or suspension containing the nanostructure material; (5) selectively adding "chargers" to the solution; (6) immersing electrodes in the solution, the substrate or object upon which the nanostructure material is to be deposited acting as one of the electrodes; (7) applying a direct and/or alternating current thus creating an electrical field between the electrodes for a certain period of time thereby causing the nanostructure materials in the solution to migrate toward and attach themselves to the substrate electrode; (8) gradually drawing the object away from the liquid while keeping the foremost surface of the deposited materials in contact with the liquid to allow continuous deposition of the nanostructure materials on the substrate; and (9) optional subsequent processing of the coated substrate. It is within scope of the present invention to limit the process solely to a combinations of some or all of these general steps. However, it is also contemplated that additional steps and processes may be included. Also comprehended within the scope of the invention is to perform the method in the specific sequence of all or a combination of some of the steps described. Alternatively, the sequence of steps can differ from that described herein.

The process begins with pre-formed, "raw" nanostructure-containing material, preferably with a high aspect ratio, or a nanotube-containing material, such as a carbon nanotube-containing material. This raw material can comprise at least one of single-walled carbon nanotubes, multi-walled carbon nanotubes, silicon, silicon oxide, germanium, germanium oxide, carbon nitrides, boron, boron nitride, dichalcogenide, silver, gold, iron, titanium oxide, gallanium oxide, indium phosphide, or magnetic particles such as Fe, Co, and Ni enclosed within nanostructures. According to a preferred embodiment, the raw carbon nanotube-containing material comprises single-walled carbon nanotubes. The carbon nanotubes can be formed by any suitable technique, such as the above-mentioned arc-discharge, laser ablation and chemical vapor deposition methods.

It is also contemplated by the present invention that raw materials be in the form of nanotube structures with a composition of $B_xC_yN_z$ (B=boron, C=carbon, and N=nitrogen), or nanotube or concentric fullerene structures with a composition $MS_2$ (M=tungsten, molybdenum, or vanadium oxide) can be utilized. These raw materials can be formed by any suitable technique, such as the above-mentioned arc-discharge technique.

The raw material can be fabricated according to a number of different techniques familiar to those in the art, such as those mentioned above in the Background.

According to a further embodiment of the present invention, magnetic tubes or nanowires can be used as the starting materials. For example, as illustrated in FIG. 1, nanostructured materials 100, such as carbon nanotubes, can contain magnetic particles 110. Several techniques to form these magnetic particles are envisioned. One such technique involves the chemical vapor deposition method. Magnetic particles such as Fe, Co, and/or Ni are used as catalysts in the CVD technique. Hydrocarbons are used as the carbon source. Under appropriate conditions, the magnetic particles will function as nucleation sites for nanotube formation. The magnetic particles 110 are trapped either at the ends or tips of the nanotubes. Alternatively, nanotubes, such as single or multi-walled carbon nanotubes are formed as a starting material using a suitable technique. The starting material is then processed to open the ends of the nanotubes. The magnetic particles are then inserted into the core of the nanotubes by either solution, electrochemical, vapor phase, or solid state processing techniques. The ends can then be closed by suitable methods, such as the formation of passivation layers. Such techniques are described in greater detail in U.S. Patent Publication No. US 2003/0180472, the disclosure of which is incorporated herein by reference, in its entirety.

Figure 2:
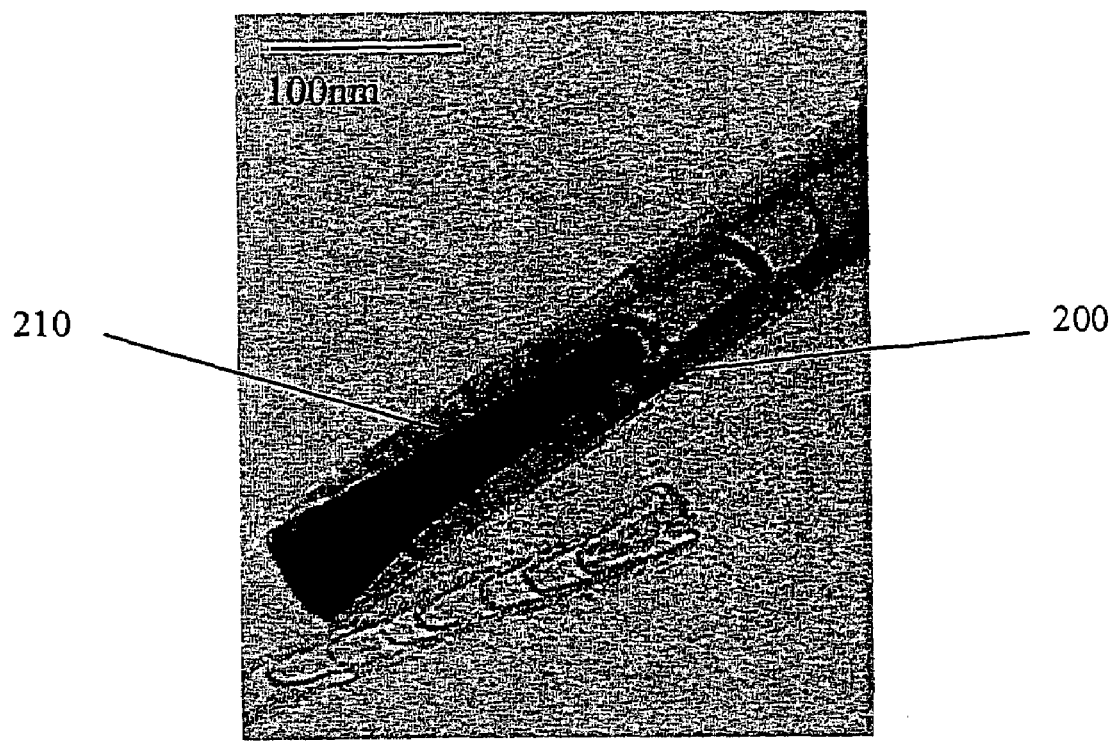
FIG. 2 is a TEM image of a nanostructure-containing material.
Figure 3:
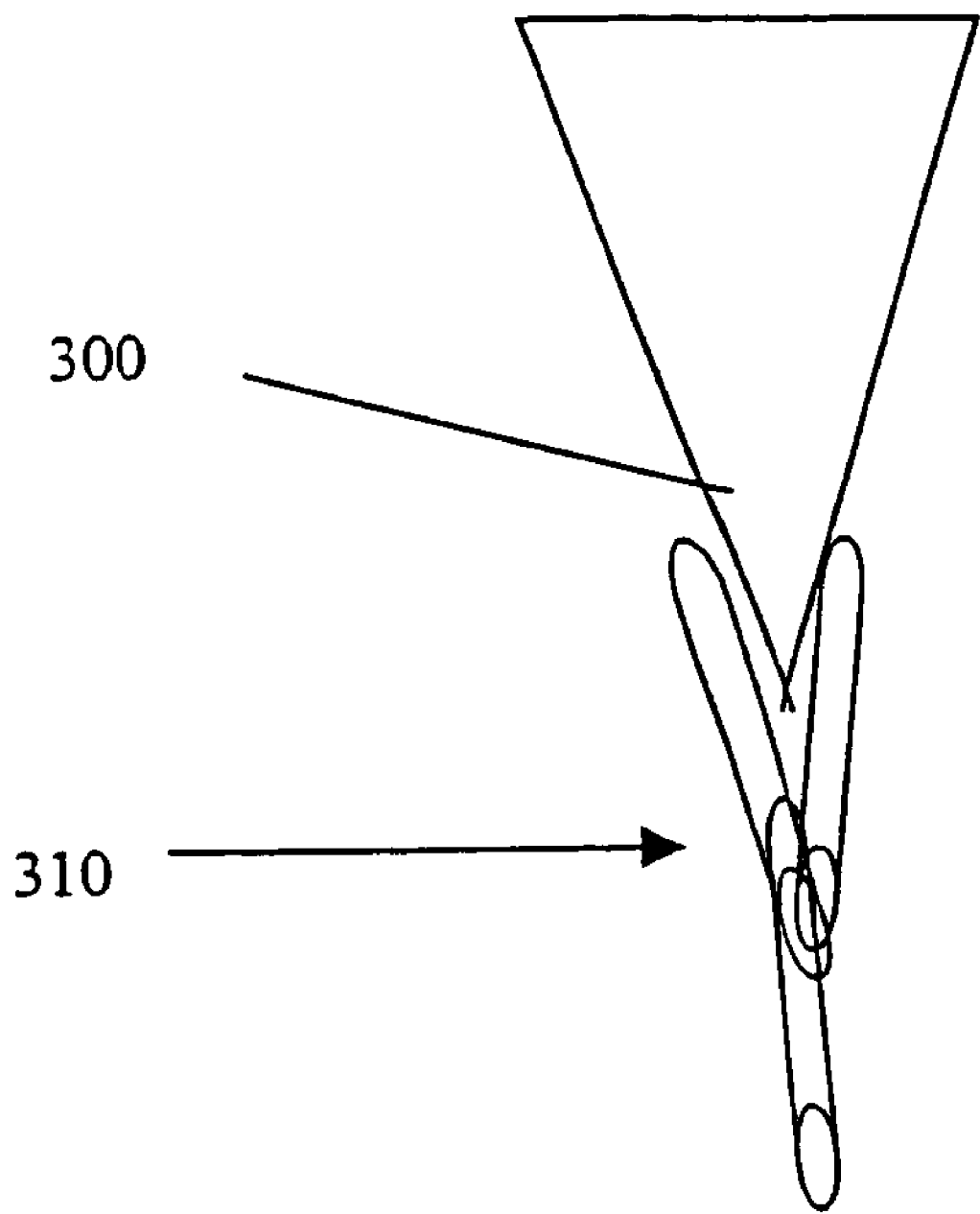
FIG. 3 is a schematic illustration of the nanostructure-containing materials of FIG. 1 and FIG. 2 assembled onto an object by disclosed methods.

FIG. 2 is illustrative of such a magnetic particle described above. As illustrated, for example, in FIG. 2, a multi-walled carbon nanotube 200 is provided and includes a Co particle 210 deposed therein. As illustrated in FIG. 3, magnetic particles 310 can also be assembled or attached to a sharp tip, such as a probe for an atomic force microscope, according to methods disclosed in greater detail herein.

As further explained and illustrated herein, these magnetic particles can be assembled or attached to a sharp tip, such as a probe for an atomic-force microscope, according to methods disclosed in greater detail below. By measuring the interaction force between the magnetic tip fabricated as described above and an object to be imaged, the magnetic structure of the object can be imaged. One such object comprises magnetic data storage media. Because the small size of the above-described magnetic particle, a much higher resolution can be expected.

The raw nanostructure-containing material can be subjected to purification. A number of techniques for purifying the raw materials are envisioned. According to one preferred embodiment, the raw material can be purified by reflux in a suitable solvent, such as a combination of peroxide ($H_2O_2$) and water, with an $H_2O_2$ concentration of 1–40% by volume, preferably about 20% by volume $H_2O_2$, with subsequent rinsing in $CS_2$ and then in methanol, followed by filtration. According to an exemplary technique, approximately 10 to 100 ml of peroxide is introduced into the medium for every 1 to 10 mg of nanotubes in the medium, and the reflux reaction is carried out at a temperature of 20 to 100° C. (see, e.g. U.S. Pat. No. 6,553,096 (Ser. No. 09/679,303)).

According to another alternative, the raw nanostructure-containing material is placed in a suitable liquid medium, such as an acidic medium, an organic solvent, or an alcohol, preferably methanol. The raw materials are kept in suspension within the liquid medium for several hours using a high-powered ultrasonic horn, while the suspension is passed through a microporous membrane. In another embodiment, the raw materials can be purified by oxidation in air or an oxygen environment at a temperature of 200 to 700° C. The impurities in the raw materials are oxidized at a faster rate than the nanotubes.

In yet another embodiment, the raw materials can be purified by liquid chromatography to separate the nanotubes/nanowires from the impurities.

The raw material is then optionally subjected to further processing to shorten the nanotubes and nanotube bundles, such as chemical etching or milling.

The purified raw material, regardless of whether subjected to the above-described shortening process, can also optionally be annealed at a suitable temperature, such as 100° C. to 1200° C. According to a preferred embodiment, the annealing temperature is 100° C. to 600° C. The material is annealed for a suitable time period, such as approximately 1 to 60 minutes. According to a preferred embodiment, the material is annealed for approximately 1 hour. The material is annealed in a vacuum of about $10^{-2}$ torr, or at an even higher vacuum pressure. According to a preferred embodiment, the vacuum is about $5 \times 10^{-7}$ torr.

The above described "raw" or preformed material can now be introduced into a solution for deposition onto an object or substrate and/or for forming articles such as conducting wires.

According to an alternative embodiment, the purified nanostructure-containing material is functionalized before placement into the above-mentioned solution or suspension. For example, the purified nanostructure-containing material can be subjected to oxidation in a strong acid to render the material hydrophilic. One exemplary process for doing this includes introducing the purified nanostructure material into a solution of $H_2SO_4$ and $HNO_3$ for 10–24 hours while being subjected to ultrasonic energy. Alternatively, purified non-structural-containing material can be chemically functionalized by chemically or physically attaching chemical species to the outer surfaces of the nanostructures so as to render the nanostructures soluble or facilitate the formation of stable suspensions.

A suitable liquid medium is selected which will permit the formation of a stable suspension of the raw nanostructure material therein. According to a preferred embodiment the liquid medium comprises at least one of water, methanol, ethanol, alcohol, and dimethylformamide (DMF), and glycerol. Upon adding the raw material to the liquid medium, the mixture can optionally be subjected to ultrasonic energy or stirring using, for example, a magnetic stirrer bar, in order to facilitate the formation of a stable suspension. The amount of time that the ultrasonic energy is applied can vary, but it has been found that approximately two hours at room temperature is sufficient.

The concentration of raw material in the liquid medium can be varied, so long as a stable suspension is formed. For example, with a liquid medium comprising methanol, approximately 0.01 mg of the raw material, such as single-walled carbon nanotubes, can be present per ml of the liquid medium (0.01 mg/ml) and provide a stable suspension. When the liquid medium comprises DMF, approximately 0.4 to 0.5 mg of the raw material, such as single-walled carbon nanotubes, can be present per ml of the liquid medium (0.4 to 0.5 mg/ml) and provide a stable suspension. When shortened carbon nanotubes are used, stable suspension can be obtained at a higher concentration. For example, a stable dispersion of approximately 0.1 mg/ml of shortened nanotubes in water can be formed. In another example, single-walled carbon nanotube bundles rendered hydrophilic by chemical treatments are dispersed in water. The concentration of the nanotubes is adjusted according to the desired deposition rate.

According to one embodiment, a charger is added to the suspension in order to facilitate electrophoretic deposition. One such preferred charger is $MgCl_2$. Other possible chargers include $Mg(NO_3)_2$, $La(NO_3)_3$, $Y(NO_3)_3$, $AlCl_3$, and sodium hydroxide. Any suitable amount can be utilized. Amounts ranging from less than 1% up to 50%, by weight, as measured relative top to the amount of nanostructure-containing material, are feasible. According to a preferred embodiment, the suspension can contain less than 1% of the charger.

According to another embodiment of this invention, a small amount of carbon nanotubes are dispersed in water. The suspension is sonicated to achieve a uniform dispersion of the carbon nanotubes. No charger is added to the suspension. Alternating current dielectrophoresis technique is used to deposit the carbon nanotubes onto the desired object. Under the AC field, the carbon nanotubes are polarized and will migrate to certain field direction depending on the field concentration, the frequency of the AC field, and the dielectric constants of the liquid and the carbon nanotubes.

A plurality of electrodes are then introduced into the suspension. According to a preferred embodiment, two electrodes are utilized. One of the electrodes comprises the object upon which the nanostructure material is to be deposited. Any suitable object or substrate material is envisioned, so long as it possesses the requisite degree of electrical conductivity. According to a preferred embodiment, the object is either metal or doped silicon. According to another preferred embodiment at least one of the electrodes comprises one or more sharp tips.

An alternating current, or a direct current, is applied to the electrodes thereby producing an electrical field between the electrodes. This causes the nanostructure material in the suspension to migrate toward and attach to the substrate electrode. According to one embodiment, the electrical field applied between electrodes is 0.1 to 1000 V/cm, and a direct current of 0.1 to 200 $mA/cm^2$ is applied for 1 second to 1 hour. According to a further embodiment, an alternating current at a frequency of 10 Hz to 10 GHz is applied.

According to a preferred embodiment, the above-described electrophoretic deposition is carried out at room temperature.

The rate of deposition, as well as the structure and morphology of the deposited nanostructure material can be influenced by many factors. Such factors include: the concentration of nanostructure material in the suspension, the concentration of the charger material (e.g. $MgCl_2$), if any, in the suspension, the conductivity of the object, and control of the power source (i.e. applied current, voltage conditions and frequency when alternating current is applied).

For instance, when direct current is applied, the particular electrode (i.e. anode or the cathode) to which the nanostructure material migrates can be controlled through the selection of the charger material. For example, the use of a negative charger, such as sodium hydroxide (NaOH) imparts a negative charge to the nanostructure material, thereby creating a tendency for the nanostructure material to migrate towards the positive electrode (cathode). Conversely, when a positive charger material is used, such as $MgCl_2$, a positive charge is imparted to the nanostructure material, thereby creating a tendency for the nanostructure material to migrate toward the negative electrode (anode).

When an alternating current field is used, the particular electrode to which the nanostructure material migrates can be controlled through the selection of alternating current frequency, dielectric constant of the liquid comparing to the nanostructure material, the field concentration, and the geometry of the electrodes.

The coated object, with nanostructure-containing material deposited thereon may optionally be subjected to further processing. For example, the coated object may be annealed to remove the liquid medium. Such an annealing procedure may be preferable, since removal of impurities such as residual suspension medium improves the electrical and thermal contact and bonding between the nanostructure material and the object. By way of example, the coated substrate can be heated to a temperature of approximately 100 to 1200° C. for approximately 1 hour, and then at approximately 800° C. for 2 hours, both at a vacuum of approximately $5 \times 10^{-7}$ torr.

According to a further embodiment, the adhesion of carbon nanotubes to the substrate can be further improved by incorporation of adhesion promoting materials such as binders, carbon-dissolving or carbide-forming metal and high temperature annealing. These materials can be introduced by, for example, one of the following processes: co-deposition of the nanostructures and particles of adhesion promoting materials, sequential deposition, pre-deposition of a layer of adhesion promoting materials, etc.

In one embodiment, binders such as polymer binders are added to the suspension of the nanostructure-containing material, which is then either stirred or sonicated to obtain a uniform suspension. Suitable polymer binders include poly(vinyl butyral-co vinyl alcohol-co-vinyl acetate) and poly(vinylidene fluoride). Suitable chargers are chosen such that under the applied electrical field, either DC or AC, the binder and the nanostructures would migrate to the same electrodes to form a coating with an intimate mixing of the nanostructures and the binder.

In another embodiment, small metal particles such as titanium, iron, lead, tin, cobalt are mixed into the suspension of the nanostructure-containing material. Suitable chargers are chosen such that under the applied electrical field, the metal particles and the nanostructures will migrate to the desired electrode to form a uniform coating with an intimate mixing of the metal particles and the nanostructures. After deposition, the coated object is annealed in vacuum with a base vacuum pressure of $10^{-3}$ torr or greater for 0.1 to 10 hours. Preferably, the diameter of the particles is smaller than 1 micrometer.

The binders or adhesion promoting materials can be added in any suitable amount. Amounts ranging from 0.1 to 20% by weight, measured relative to the amount of nanostructure-containing material is envisioned.

In another embodiment, the object to be coated with the nanostructures is first coated with at least one layer of adhesion-promoting metal such as titanium, iron, lead, tin, cobalt, nickel, tantalum, tungsten, niobium, zirconium, vanadium, chromium or hafnium. The layer can be applied by techniques such as electrochemical plating, thermal evaporation, sputtering or pulsed laser deposition. After electrophoretic deposition of the nanostructures, the film is annealed in vacuum with a base vacuum pressure of $10^{-3}$ torr or greater for 0.1 to 10 hours.

The above-described processes are advantageously well-adapted for high output and automation. These processes are also very versatile. The methods of the present invention are useful in producing articles including nanostructure-containing materials, which have properties that make them beneficial for use in a number of different applications. The processes can be used to produce articles of micrometer or larger size as well as larger or macromolecules including DNA.

Generally, methods of the present invention are especially beneficial in providing nanotube and/or nanorod material for incorporation into profilometers and probes for electron microscopes, electron field emission cathodes for devices such as x-ray generating devices, gas discharge tubes, lighting devices, microwave power amplifiers, ion guns, electron beam lithography devices, high energy accelerators, free electron lasers and flat panel displays. For example, the electrophoresis method disclosed can be used to deposit an individual or a bundle of carbon nanotubes or nanowires selectively onto a sharp tip. This sharp tip can be, for example, the tip used for microscopes including atomic force microscopes (AFM), scanning tunneling microscopes (STM), magnetic force microscopes (MFM), and chemical force microscopes (CFM). The method can also lead to the production of continuous or long fibers of carbon nanotubes and other nanostructure materials. The method can further be used to make electrical interconnects using nanostructure materials in electrical circuitry.

Specific techniques and their associated articles which are consistent with the principles of the present invention, as outlined above, will now be described for purposes of illustration.

Figure 4A:
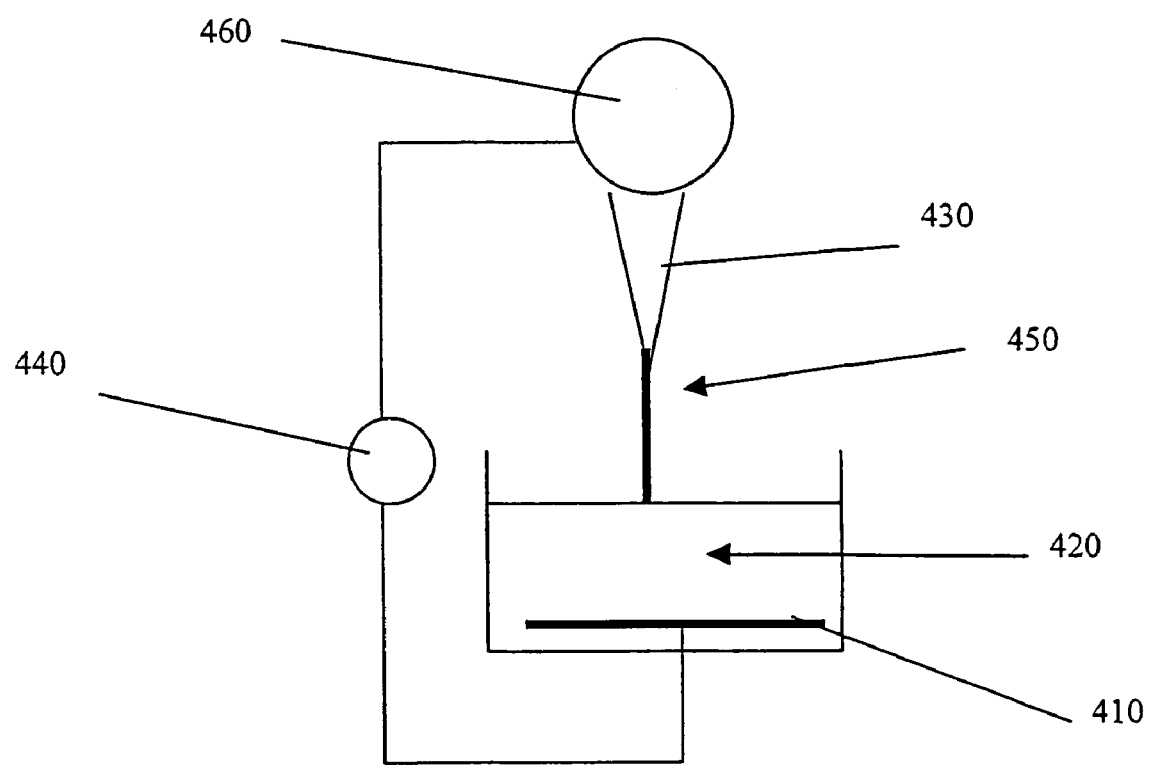
FIGS. 4A and 4B are schematic illustrations of one embodiment of a process conducted according to disclosed methods.
Figure 4B:
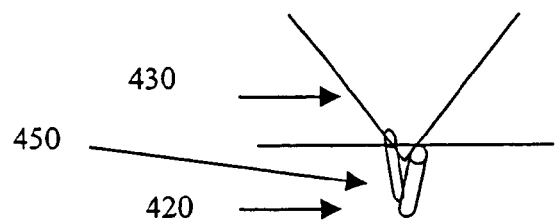
Figure 4B:
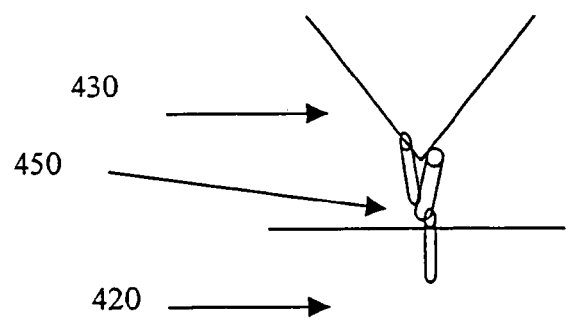
Figure 4B:
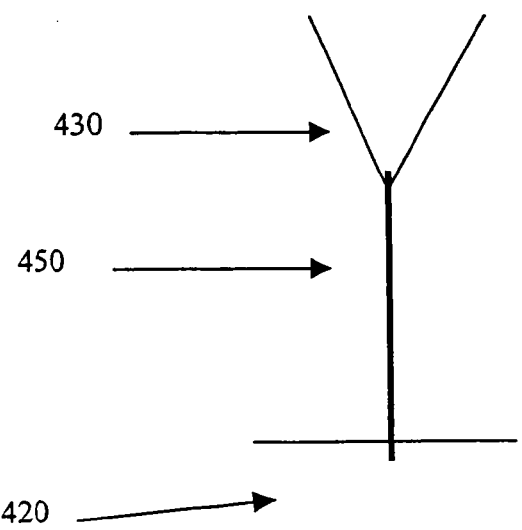

One such technique is illustrated in FIGS. 4A and 4B, where a dilute suspension of nanostructure-containing material such as nanotube or nanowire is first prepared. A counter electrode 410 is first immersed into the suspension 420. A metal tip 430 is used as the second electrode. A metal tip can be formed, for example, by chemically etching a standard metal wire, such as a tungsten wire. Metal tip 430 is first placed perpendicular to the surface of suspension 420, with the sharp tip where the nanostructure-containing material is to be deposited, just slightly above the top surface of the suspension 420. The tip 430 is then gradually moved towards the surface of the suspension 420. A power source 440 is electrically connected to electrode 410 and tip 430. A meter such as a current meter can be used to monitor the electrical current between the counter electrode and the metal tip. In addition, an appropriate optical magnification device can be used to monitor the gap between the metal tip 430 and the suspension surface 420. When the tip 430 touches the surface of the suspension 420, the electrical current passing between the two electrodes is detected. Depending on the concentration of the nanostructure-containing material in the suspension and the electrical field used, the tip 430 is allowed to stay in contact with for a pre-determined time. Voltage is applied by direct or alternating current via power source 440 between the two electrodes. The voltage is then turned off after the predetermined time and the tip 430 is raised to be above the suspension to stop the deposition process. Alternatively, as illustrated in FIG. 4B, the voltage can remain on while the tip 430 is gradually withdrawn from suspension 420 thereby forming a wire or strand of nanotubes 450 attached to the tip 430. A device 460 which could be a stage or a roller, for imparting rotational and/or linear movement to the tip 430 may be incorporated. The speed by which the tip is withdrawn is controlled according to the deposition rate of the nanostructure material 450 such that only the outermost surface of the nanostructure material that attached to the tip 430 is in contact in the suspension 420. The metal tip 430 with a carbon nanotube(s) 450 or other nanostructure attached thereto is vacuum can also be annealed to increase the bonding between the tip and the nanostructure.

Figure 5A:
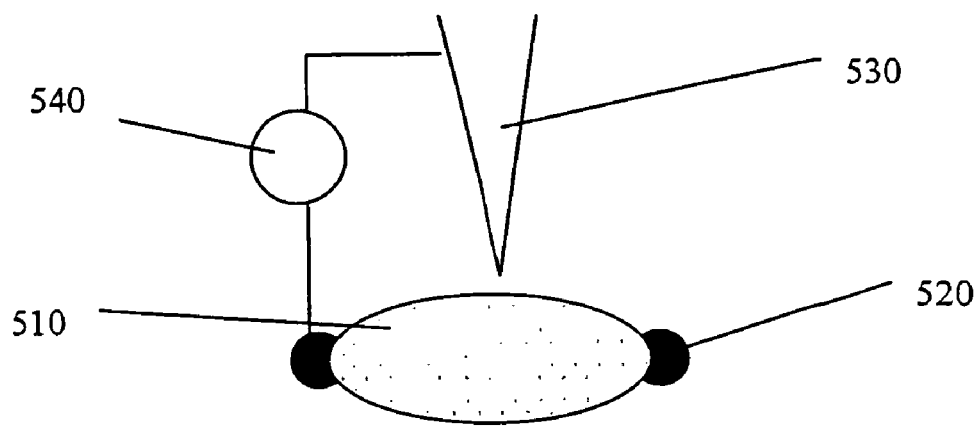
FIGS. 5A and 5B are schematic illustration of a further embodiment of a process conducted according to disclosed methods.
Figure 5B:
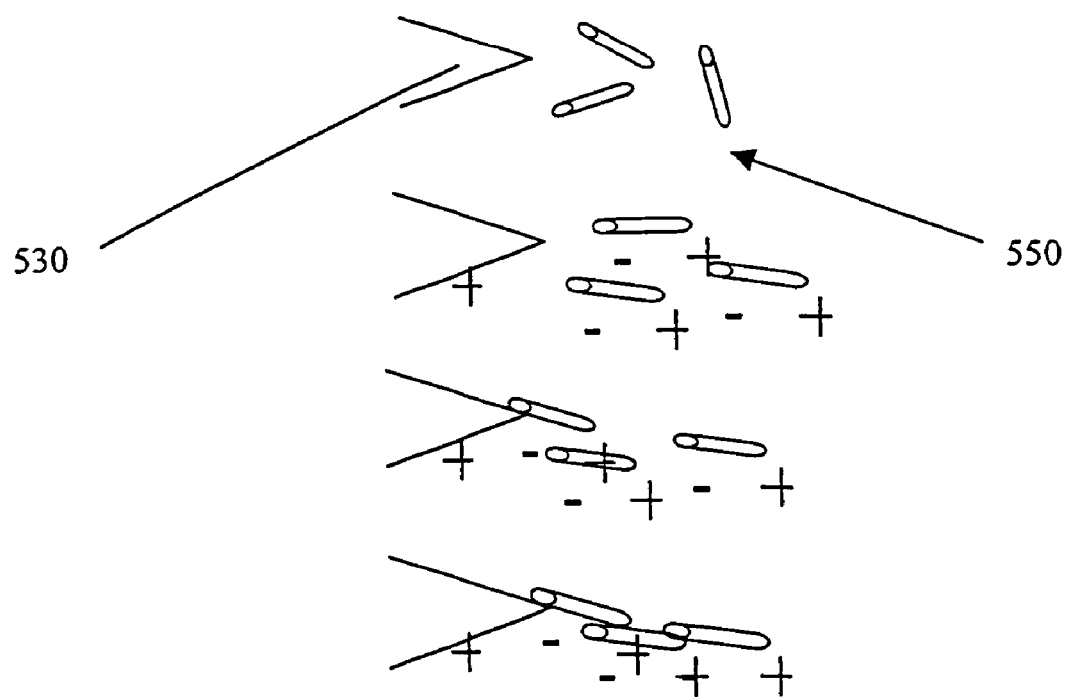

Another embodiment of the invention is described by reference to FIGS. 5A and 5B. A nanostrucutre-containing material such as any of the materials previously disclosed, and preferably carbon nanotubes, is dispersed in a suitable solvent such as water at a concentration of about 0.01 g/L. The suspension is sonicated such that the material is dispersed uniformly inside the liquid. A droplet of the nanotube/water suspension 510 is applied to a metal o-ring 520. The metal o-ring 520 is movable, for example, mounted on a translation stage (not shown). The metal tip 530 is electrically connected to a power supply 540 that is also connected to the metal o-ring 520. Initially the metal tip 530 is not in contact with droplet 510. In a preferred embodiment, the set-up is placed under an optical microscope. A 20 V and 10 MHz AC signal is established by an AC power source 540. Under the microscope, tip 530 is moved gradually towards droplet 510. After they are in physical contact, they are held still for approximately 1 to 60 seconds under the electrical field. Tip 530 is then gradually removed from the liquid. While the metal tip 530 is in physical contact with the droplet 510, an electrical circuit is formed, with metal tip 530 and the metal o-ring acting as the two electrodes. As illustrated in FIG. 5B, under the AC field, the nanostructures 550 are polarized. Because the electrodes are asymmetric, the field is not evenly distributed and concentrates around the tip. The nanostructures 550, e.g.—nanotubes, are thereby drawn to the tip 530 as illustrated in FIG. 5B. By adjusting the nanostructure concentration and the deposition time, a single or group of nanostructures, such as a single carbon nanotube or carbon nanotube bundle(s) can be attached to the metal tip.

As one possible variation on the above-described procedure, a direct-current electrical field rather than an alternating-current field is established between the tip 530 and the counter electrode or o-ring 520. A suitable "charger" such as $MgCl_2$ is added to the suspension. Under the electrical field, the nanostructures 550 or nanotubes migrate toward the tip 530 and attached to the surface to the tip.

In another embodiment of the invention, a wire comprising nanostructures, preferably carbon nanotubes, is fabricated by techniques similar to the ones described above in connection with FIGS. 4A, 4B, 5A and 5B. As shown in FIGS. 4B and 5B, when an AC field is established, the nanostructures 450, 550 or carbon nanotubes dispersed in the liquid are polarized and aligned to the field direction. Under the asymmetrical electrical field, the nanostructures 450, 550 then migrate toward the sharp electrode tip 430, 530 where the field is higher. They will then attach to the tip 430, 530, which is initially the outermost surface of the electrodes. As more nanostructures 450, 550 are drawn in and attached, the outermost nanostructure 450, 550 or carbon nanotube that is attached becomes the outermost surface of the electrodes. A long continuous wire of nanostructure material can be formed by the above process (see, e.g.— FIG. 9). By optimizing the rotation rate, the electrical field, the frequency of the electrical field, and the concentration of the liquid dispersed with the nanostructure material, a roll of continuous fiber of nanostructure materials can be fabricated. The length of the wire is controlled by parameters such as the current and the concentration of nanostructures in the suspension used. After the deposition, the wire can be further processed, such as by annealing, to increase the mechanical strength or modify the functionality.

It is further envisioned that the processes for further treatment of the fiber can be integrated into the deposition process described above. For example, it is possible that the wire or fiber drawn from the liquid can run through a furnace that is placed between device 460 and the liquid such that the properties of the fiber is enhanced during the formation process in one step. It is also envisioned that the fiber can run through a bath containing a different type of material such as a polymer melt or a polymer solution. By drawing the fiber of nanostructure material first from the liquid then moving through the liquid, the polymer will impregnate and coat the fiber and thus form a composite of nanostructure material and polymer.

Figure 6:
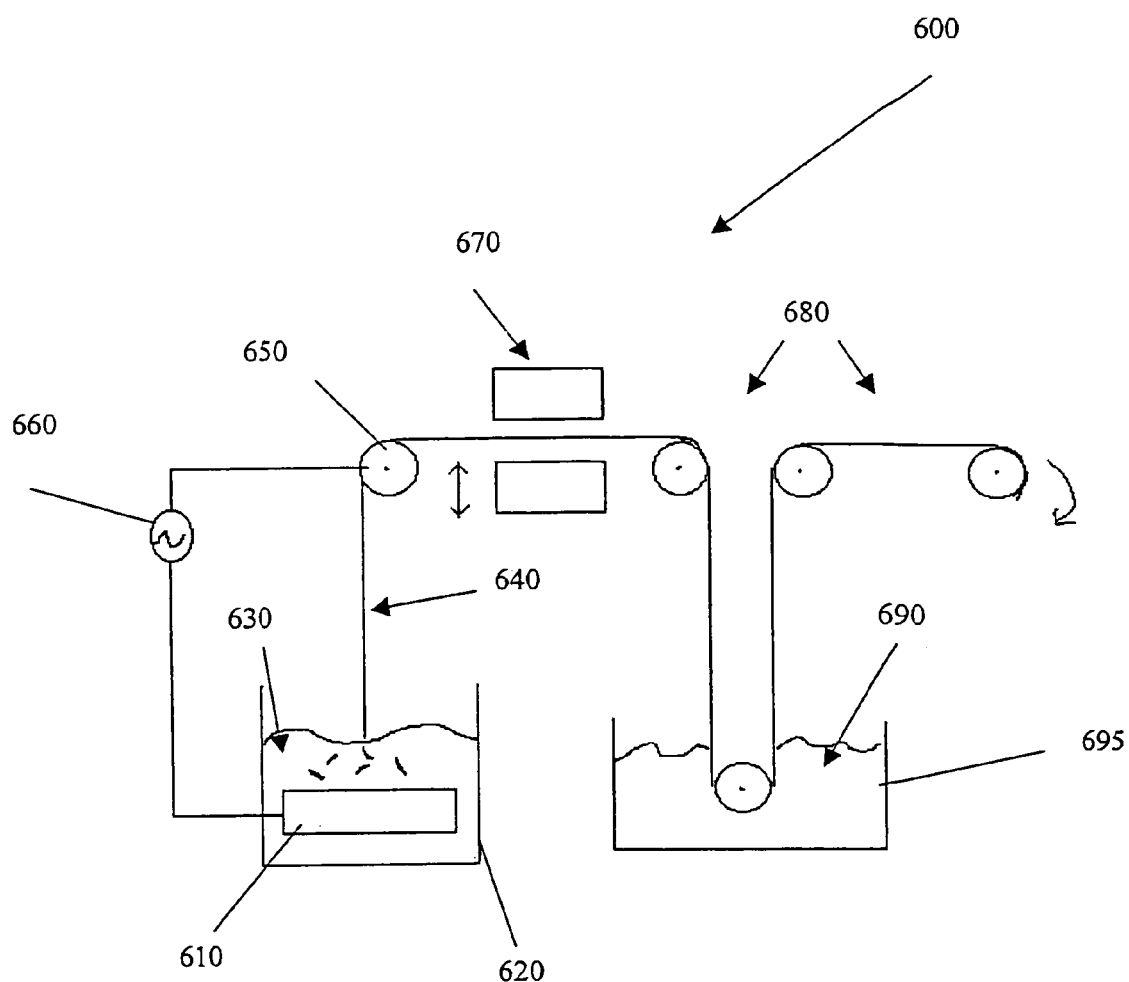
FIG. 6 is a schematic illustration of an embodiment of an apparatus for conducting the process.

An illustrative embodiment of a process and/or apparatus of the type generally described above is illustrated in FIG. 6. According to the illustrated embodiment, an electrode 610 is placed in a container 620. The container 620 is then filled with a medium containing nanostructure materials 630. A continuous string or strand of nanostructure-containing material 640 can be drawn from the medium 630 as follows. A counterelectrode in the form of a roll 650 is initially located in contact with the surface of the medium 630. The counterelectrode 650 can then moved in a direction away from the top surface of the medium 630, while a power source 660 supplies an alternating current potential between the electrode 610 and the counterelectrode 650. As described in detail herein, the nanostructurecontaining materials contained in the medium 630 attach themselves to the counterelectrode 650, and then to each other and can form a continuous string or strand 640. The string or strand of nanostructure-containing material 640 can optionally be passed through a heating device or furnace 670 which can be utilized to drive off liquids, etc. which were contained in the medium 630. According to further alternatives, a series of rolls 680 can be utilized to further transport the string or strand 640 through various additional processing steps. For example, as illustrated in FIG. 6, the string or strand 640 can be passed through a second medium 690 which can contain a second material, which is desired to be combined with the nanostructure-containing string or strand 640. For example, the medium 690 can contain a polymer melt, which can impregnate the nanostructure-containing material string or strand 640, thus forming a composite fiber. The medium 690 is located in a container 695. The strand 690 is then withdrawn from the container 695 and transported to additional steps of the process, or is a accumulated on a final roll 680. The nanostructure-containing material string or strand 640 can comprise, or consist essentially of, single-walled carbon nanotubes. Alternatively, the nanostructure-containing material can comprise or consist essentially of any of those nanostructure-containing materials previous mentioned in the present disclosure.

Figure 7:
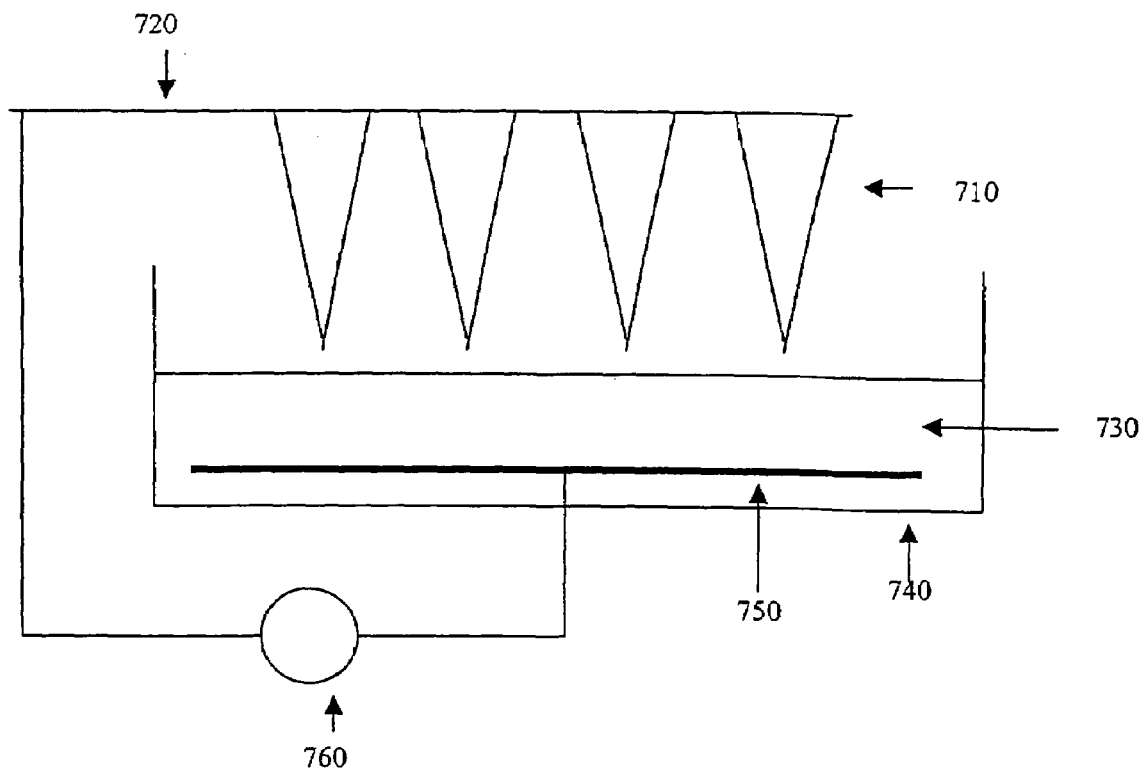
FIG. 7 is a schematic illustration of another embodiment of an apparatus for conducting the process.

In yet another embodiment of the invention, a batch-type process for simultaneous processing of multiple sharp tips at the same time is envisioned. As illustrated in FIG. 7, a group of tips 710 are either formed directly by etching from a starting material or mounted on a holder 720. A suspension of the nanostructures 730, such as carbon nanotubes is placed inside a container 740. A flat metal electrode 750 is inside the same container. An alternating current power source 760 is connected to the holder 720 and the flat electrode 750. An AC field is established between the tips 710 and the flat electrode 750. An example of the frequency is 1 KHz to 10 GHz. The container 740 is raised (or the tips 710 are lowered) until the tips 710 are in contact with the surface of the suspension 730. After a fixed dwell time (such as 1 second to 10 second), the tips 710 are separated from the suspension 730. By controlling the current, the concentration nanostructure-containing material in the suspension, and the dwell time, it is possible that one nanostructure or carbon nanotube or a group of nanostructures or carbon nanotube bundle(s) is attached to each tip. After the deposition, the tips 710 can be further processed to increase the bonding strength. The coated tips can be used as the probes for AFM, STM or other scanning probe microscopes, as microelectrodes for sensors, or as electrochemical cells.

Figure 8A:
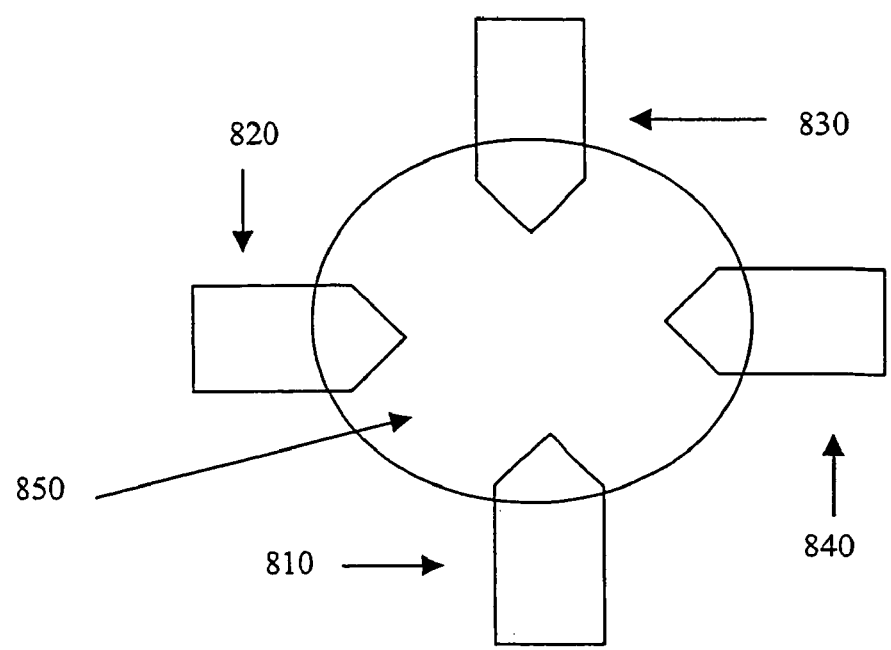
FIGS. 8A and 8B are schematic illustrations of a further embodiment of a process conducted according to the principles of the present invention.
Figure 8B:
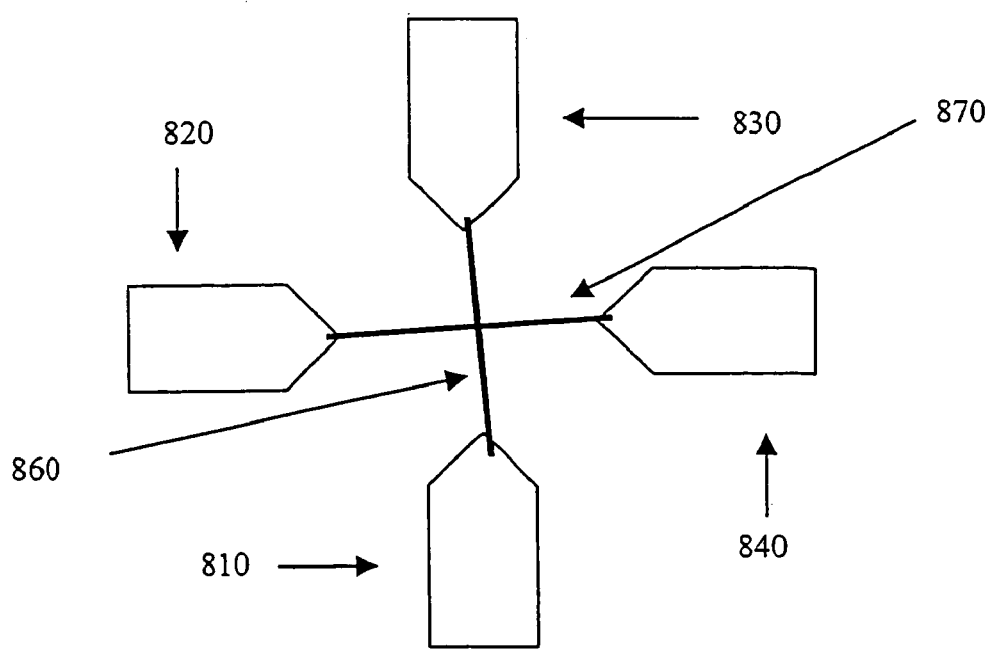

In another embodiment, wires comprising nano-objects are formed in an assembled into predetermined pattern to make electrical connections between different components in an electrical circuitry. One particular example is illustrated in FIGS. 8A and 8B. A droplet 850 of liquid containing nano-objects such as carbon nanotubes is placed in the area defined by four components 810, 820, 830 and 840, which can be components on a circuit board. An electrical field such as an AC field is first established between two components, such as 810 and 830 until a wire 860 comprising the nano-objects or nanotubes is formed and connects 810 and 830. A field is then established between 820 and 840 until a wire comprising the said nano-objects is formed and connects 820 and 840. As a result, a cross-electrical connection between the four components 810–840 is established.

Figure 9A:
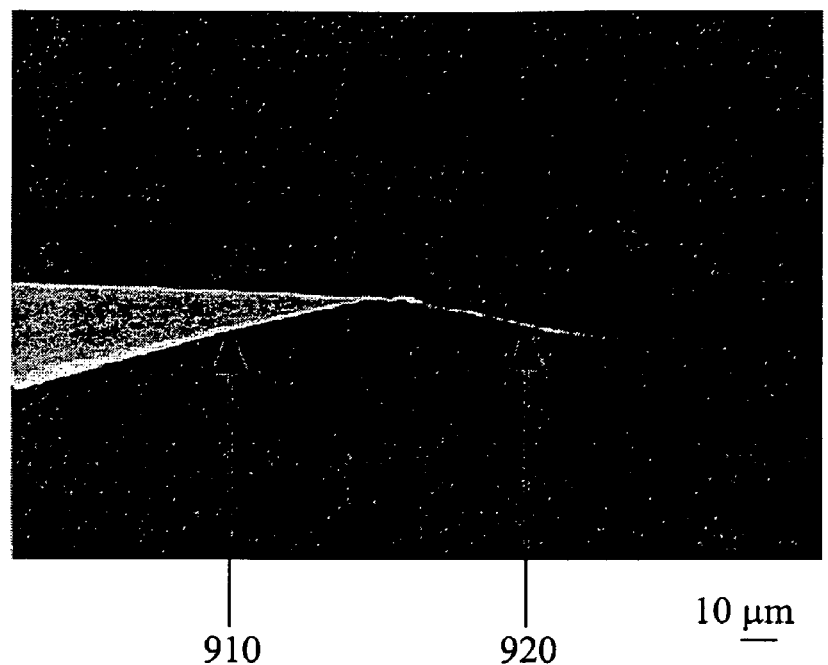
FIGS. 9A to 9E are magnified SEM images tips with attached fibrils of carbon nanotubes or nanowires.
Figure 9B:
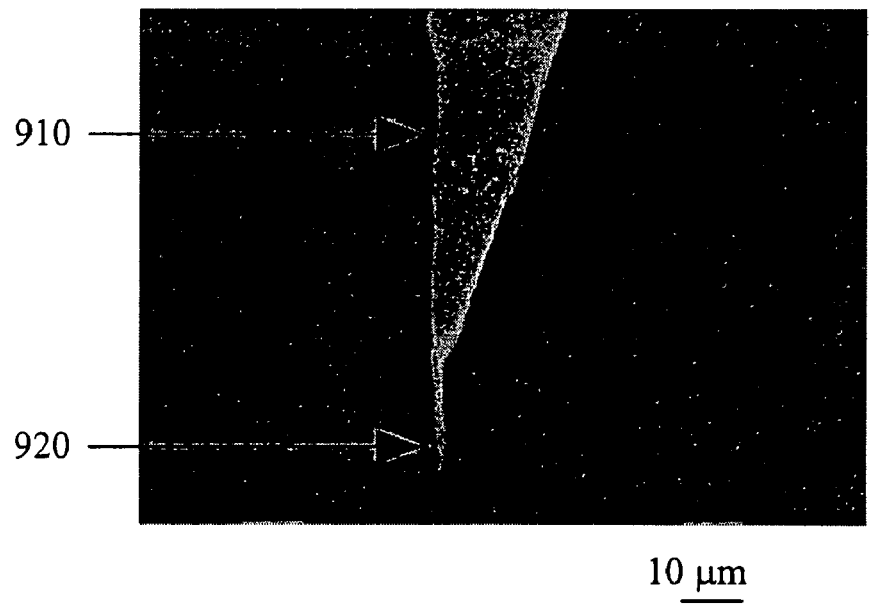
Figure 9C:
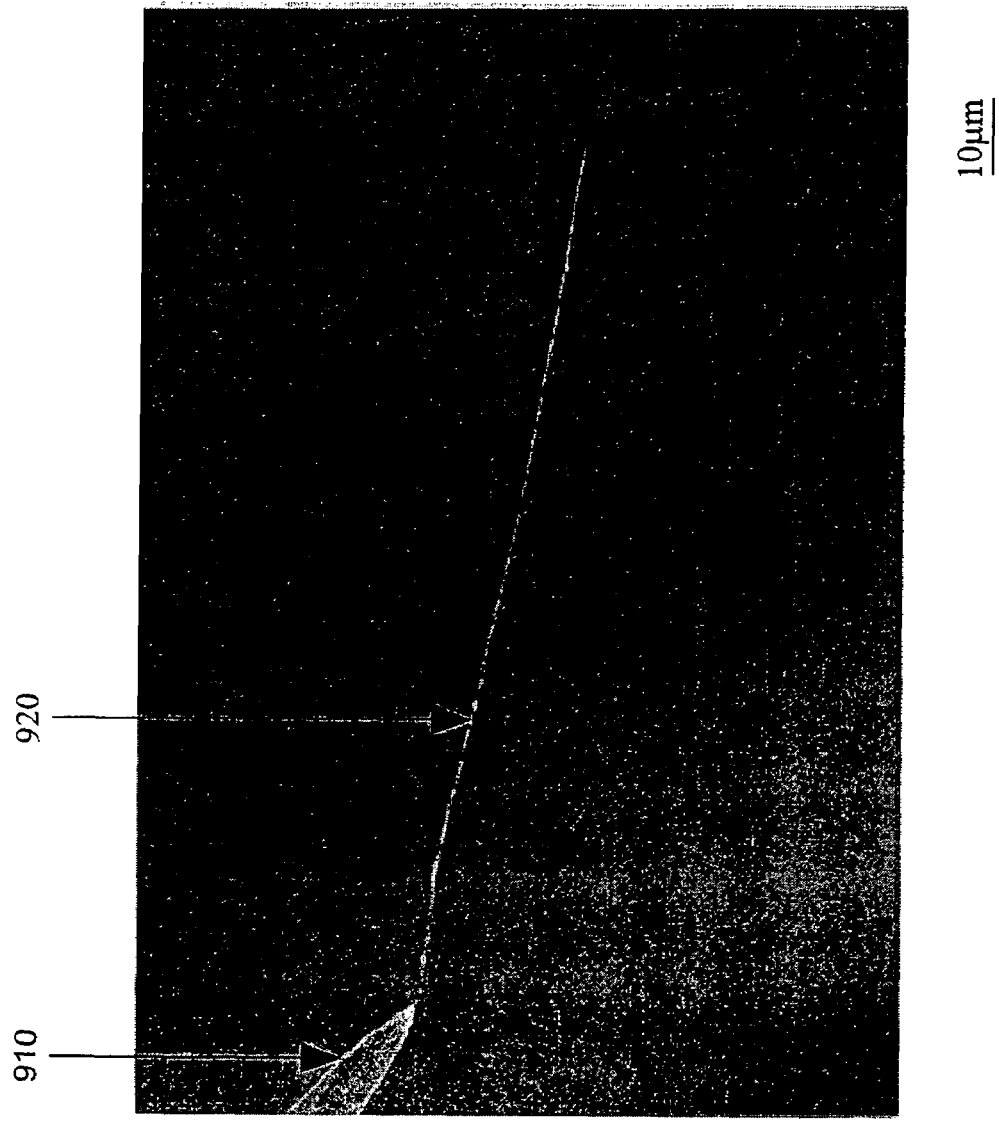
Figure 9D:
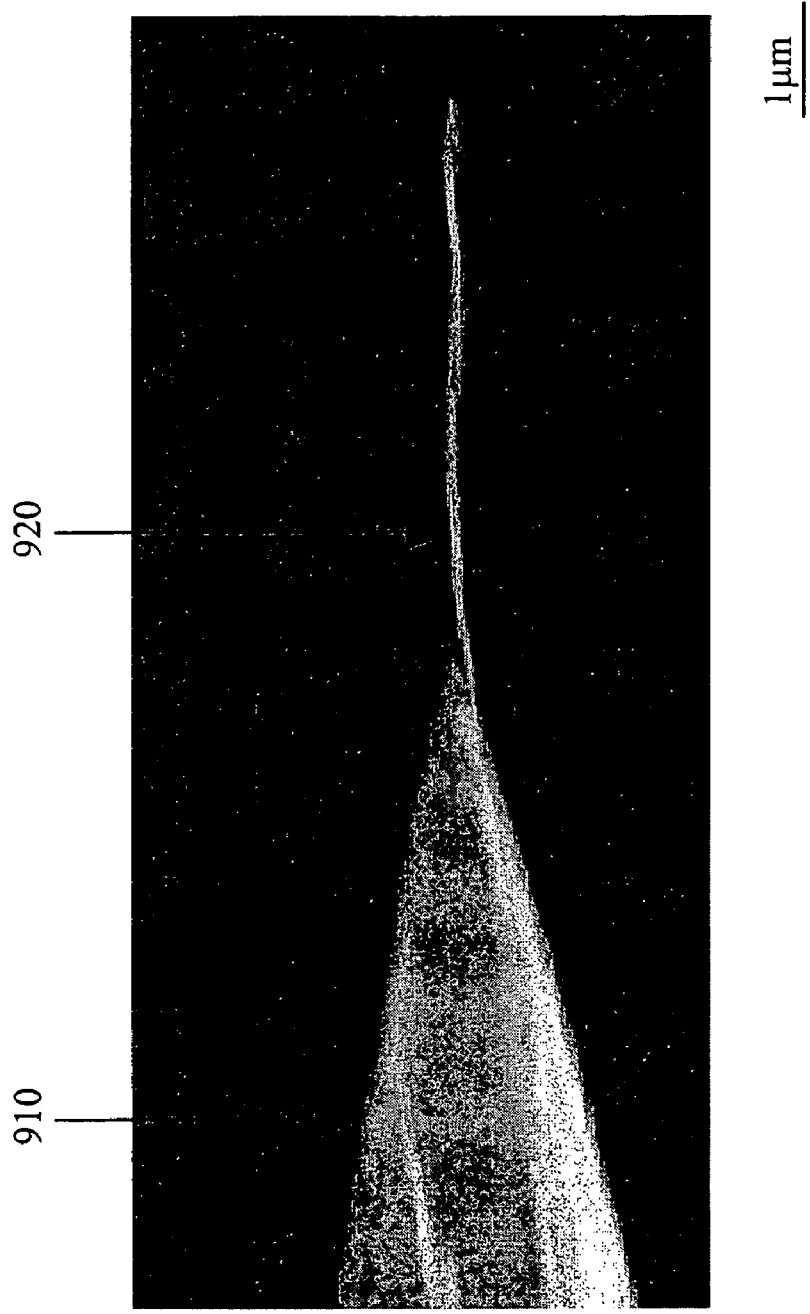
Figure 9E:
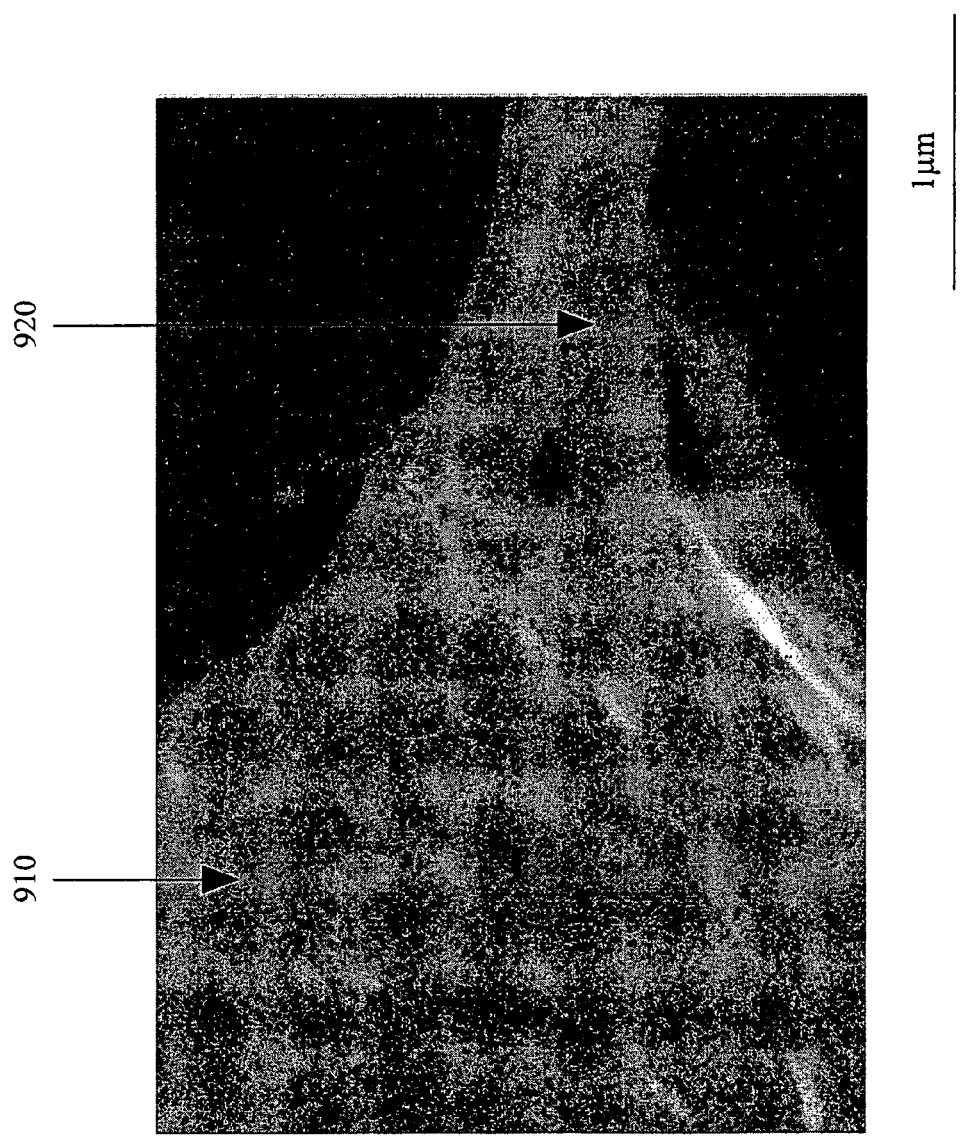
Figure 10:
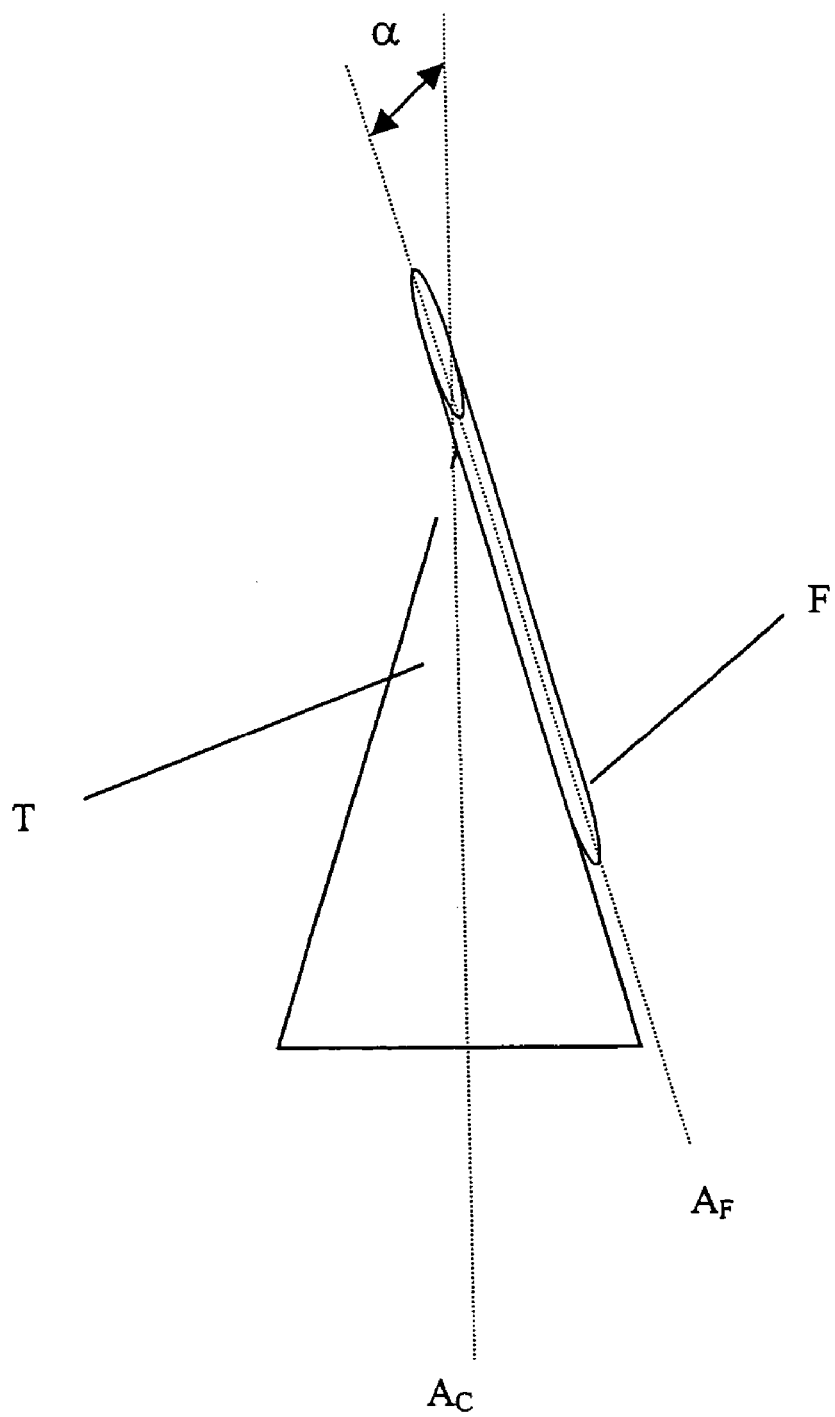
FIG. 10 is a schematic illustration of a fibril showing the relationship of the various orientations when attached to a tip.

FIGS. 9A to 9E are SEM images of sharp metallic tips 910 with attached carbon nanotubes or nanowire 920 formed according to the present invention. FIG. 9C is a scanning electron microscope (SEM) image of a wire comprising single-wall carbon nanotube (SWNT) bundles that are attached to a tungsten tip by a process of the present invention. According to exemplary embodiments, the diameter of the fibril can be less than 1.0 micron, and preferably 0.5 nm to 10 microns, preferably less than 1 micron. The length of the fibril can be 50 nm to 50 microns, preferably less than 30 microns. Tips constructed according to the present invention are capable of stable electron emission current on the order of 1 to 10 microamperes FIG. 10 is a schematic illustration of a fibril F having a generally longitudinal axis $A_F$ is attached to the generally conical sharp tip T having cone axis $A_C$, in a manner such that the fibril F is generally aligned along the cone axis $A_C$. That is, the axis $A_F$ and the axis $A_C$ define an angle α relative to each other that is less than approximately 15 degrees, and preferably, less than approximately 10 degrees.

Figure 11:
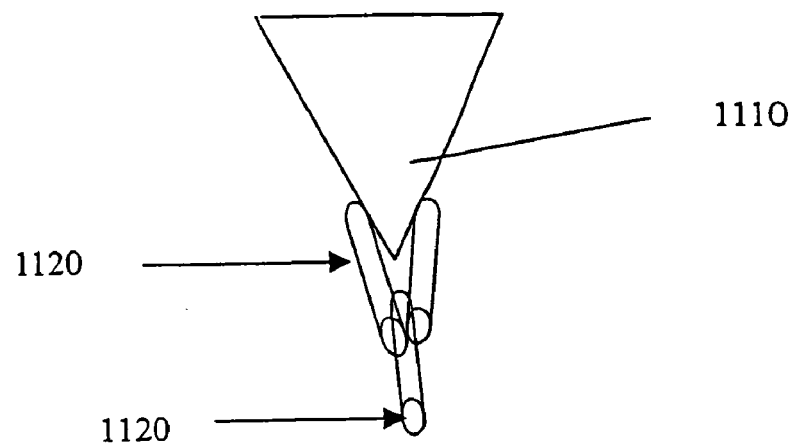
FIG. 11 is a schematic illustration of a further object formed according to another embodiment of the present invention.
Figure 12:
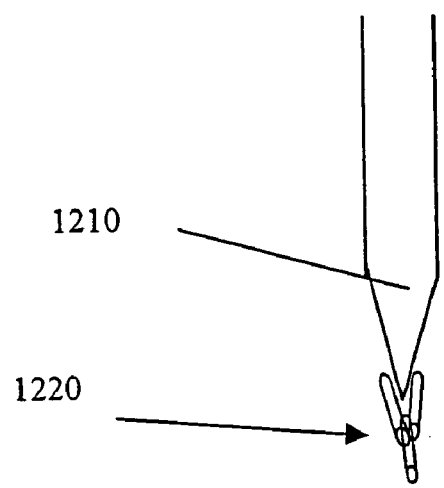
FIG. 12 is a schematic illustration of another object formed according to an alternative embodiment of the present invention.
Figure 13:
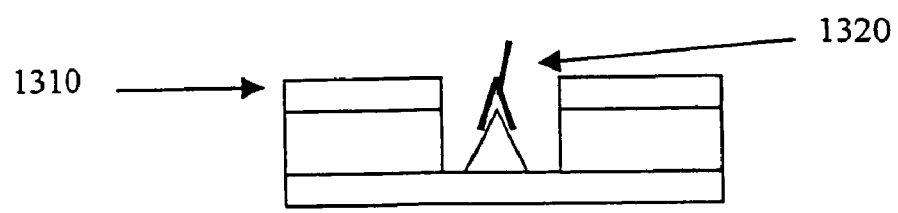
FIG. 13 is still a further object formed according to another embodiment of the present invention.

Tips with attached carbon nanotubes fabricated according to the present invention can be used in for scanning probe microscopes including atomic force microscopes, scanning tunneling microscopes, magnetic force microscopes, and chemical force microscopes. Because of the large aspect ratios and small diameters of nanostructured materials, such as the carbon nanotubes, a better imaging quality can be obtained. For example, FIG. 11 illustrates a typical atomic force microscope probe 1110 with nanostructures 1120 assembled at the tip thereof. FIG. 12 illustrates a scanning electron microscope tip 1210 having nanostructures 1220 disposed thereon. FIG. 13 is a Spindt-type electron field emitter 1310 having nanostructures 1320 assembled at the tip thereof.

According to another aspect of this invention, techniques and arrangements for separating nanostructure materials based on differences in their properties is provided. Materials containing a mixture of one or more nanostructure-containing materials can be separated. For example, metallic and semiconducting nanostructures, such as carbon nanotubes, can be separated into two sub-groups. For example, one sub-group contains only metallic carbon nanotubes, the other sub-group contains only semiconducting carbon nanotubes. In one particular example, pre-fabricated single wall carbon nanotubes are dispersed in water. More preferably the single wall carbon nanotubes are first purified by a suitable technique to remove impurity phases. An asymmetric AC field is established in the liquid by applying an AC voltage between two electrodes. One way to establish the asymmetric electrical field is to use two electrodes with different geometries. For example, one electrode has a planar geometry and the other has a sharp protrusion. The frequency of the AC field is adjusted. Because of the difference in electronic properties, the polarization of the metallic and semiconducting carbon nanotubes will have a different frequency dependence. Under an optimal frequency, the metallic carbon nanotubes will move faster towards the electrode with a protrusion than the semiconducting carbon nanotubes. In another situation, it is possible to adjust the frequency and the liquid used such that under certain conditions, the metallic carbon nanotubes move towards one electrode while the semiconducting carbon nanotubes move toward the opposite electrode. After applying the electrical field for certain time, each group of material can be collected from the liquid on the surfaces of the opposing electrodes. The method described herein can also be used to separate carbon nanotubes from magnetic particles that are present in the raw materials. The method is not limited to carbon nanotubes. It can be used to separate other nano-objects according to their electronic properties and/or geometry.

Figure 14:
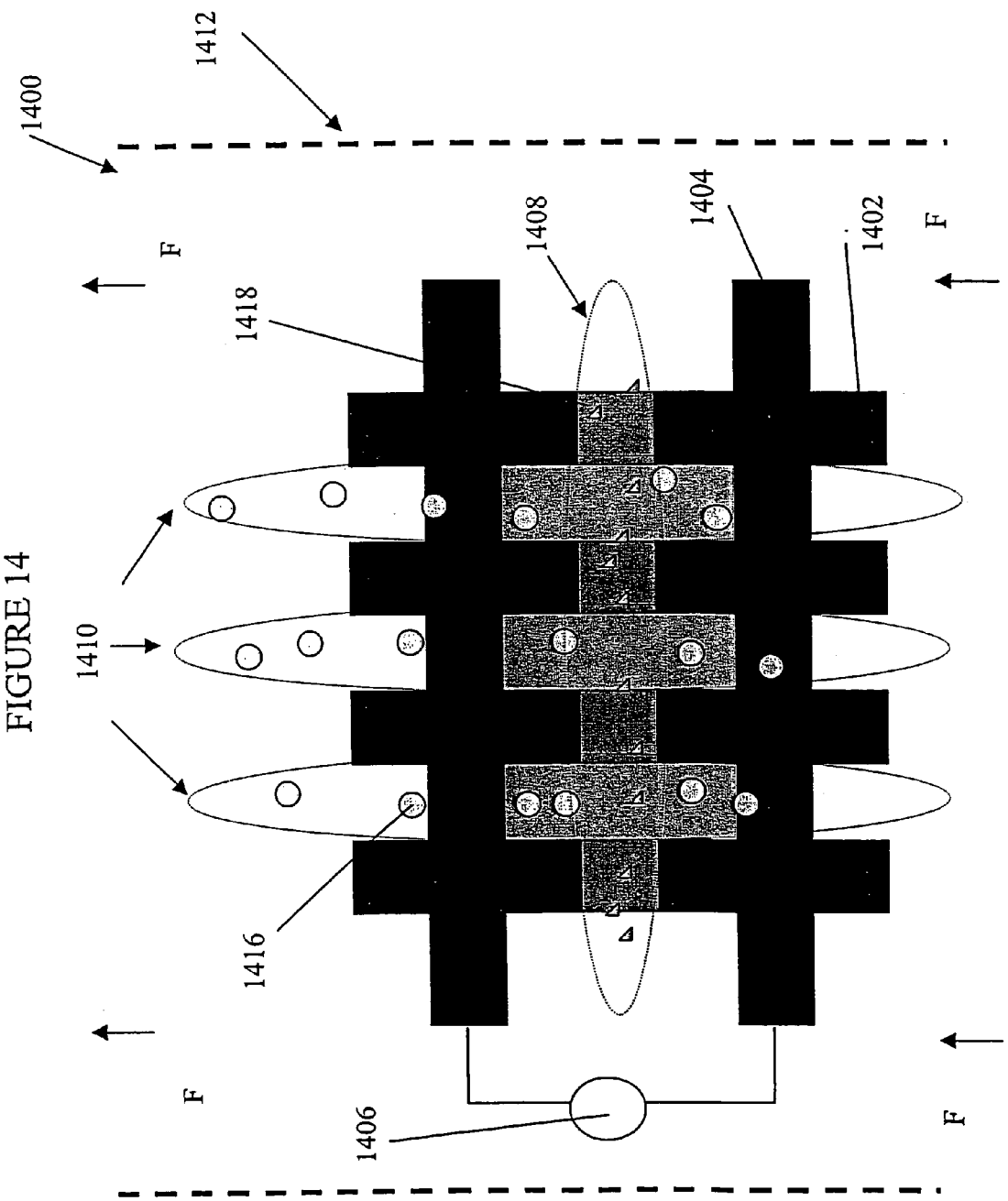
FIG. 14 is a schematic illustration of a separation arrangement and/or technique according to the present invention.

Another illustrative embodiment of a separation technique/arrangement according to the present invention is illustrated in FIG. 14.

The arrangement 1400 includes a plurality of electrodes 1402, 1404 arranged according to a particular pattern. According to the illustrative embodiment, the electrodes 1402, 1404 are disposed at 90° angles relative to one another. However, it should be recognized, that numerous other electrode patterns are contemplated. A power source 1406 supplies an alternating current to the electrodes 1402, 1404. Non-uniform electrical fields results due to fringing effects caused by the flow of alternating current through the electrodes 1402, 1404. In the illustrative embodiment, an area of a relatively high strength electrical field 1408 is produced. Further, areas of relatively low electrical field strength 1410 are also produced.

The arrangement 1400 can be placed within a channel, or chamber, schematically illustrated at 1412. A mixture containing a first type of particle 1416, and a second type of particle 1418, can be introduced into the chamber or channel 1412. The mixture containing at least two distinct types of particles can take many forms. For example, at least one of particles 1416 and 1418 can comprise a nanostructure-containing material. According to one example, the particles 1416 and 1418 are disposed within a liquid medium. According to a further example, the mixture includes a first type of nanostructure-containing material particle 1416, a second distinct type of nanostructure-containing material particle 1418, disposed in a liquid medium. The liquid medium can be introduced into the chamber or channel 1412 at one end thereof, and caused to flow, for example, generally in the direction indicated by the arrows F. Due to the differences in their properties, the particles 1416 and 1418 are polarized, or affected by the applied electrical fields in different manners. For example, the first type of particle 1416 may be negatively polarized by the applied electrical field, while the second type of particle 1418 may be positively polarized via application of the electrical field. Thus, due to the difference in polarities, the second type of particle 1418 is retained and trapped within the relatively high strength electrical field area 1408, and may adhere to the electrodes 1402, 1404. By contrast, the first type of particle 1416, due to its polarity is not attracted to the relatively high strength electrical field 1408, but instead is allowed to flow within the relatively low strength electrical field areas 1410 in the direction indicated by arrows F of FIG. 14. In this manner, the first particles 1416 can flow downstream within the chamber or channel 1412 and can be collected at a location remote from the electrodes. The second type of particles 1418, are contained within the electrical field 1408, and/or adhered to the electrodes 1402, 1404, and can thus be recovered therefrom.

Figure 15:
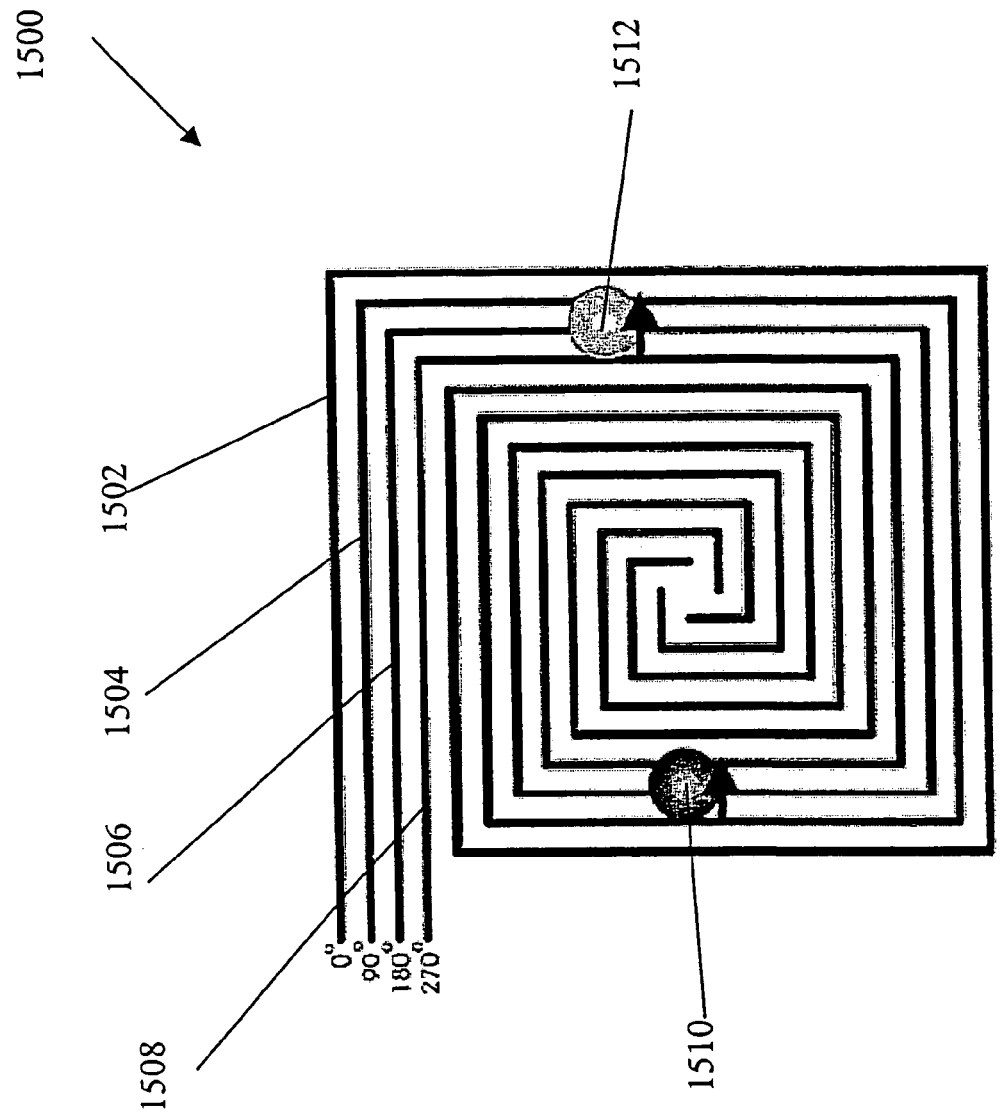
FIG. 15 is a schematic illustration of yet another separation arrangement and/or technique according to the present invention.

Another illustrative embodiment of a separation technique/arrangement is contained in FIG. 15. The arrangement 1500 includes a plurality of patterned electrodes 1502, 1504, 1506, and 1508. An alternating current is applied to these electrodes, which according to one embodiment is of equal magnitude with respect to all of these electrodes. However, the current is applied in a manner such that it is out of phase with respect to the other electrodes by 90°. The arrangement 1500 may then be placed in a mixture including at least a first and second type of particle 1510, 1512. The mixture may comprise any of those types of mixtures previously described. Due to the difference and effects caused by the applied electrical field on the first and second particles 1510, 1512, the interaction between these particles and the electrodes 1502, 1504, 1506 and 1508 is such that relative motion is imparted to each of the particles. The particular direction of motion depends on the polarizability of each of the two different types of particles 1510, 1512. Thus, one of the particles, e.g.—1510 is caused to move toward the center of the arrangement 1500, as illustrated in FIG. 15, while the other particle 1512 is caused to move in a direction away from the center of the arrangement 1500. Thus, the two groups of particles are separated in this manner. The first group of particles 1510 can be collected from the center of the arrangement 1500, and may actually adhere to the electrodes 1502, 1504, 1506, and 1508. The second group of particles 1512 migrate in a direction away from the arrangement 1500, and thus can be recovered at a location remote therefrom.

The principles of the present invention will now be further described through reference to the following exemplary, non-limiting example.

EXAMPLE

A tungsten tip prepared by chemical etching is used as the working electrode and a small metal plate or ring as the counter electrode. They are mounted on separate translation stages and were placed under an optical microscope. Single-wall carbon nanotubes were first purified, etched to ~2 $\mu$m in bundle length and rendered hydrophilic by chemical oxidation. They were then dispersed in de-ionized water. A droplet of the nanotube suspension was placed inside the metal ring. To begin the deposition, an AC field (10V at 2 MHz) was first applied between the two electrodes. The tip electrode was translated horizontally to contact the nanotube/water suspension and was gradually withdrawn under the electrical field until a fibril with the desired length was formed.

After deposition, the metal tip with the attached nanotube fibril is annealed at $10^{-6}$ torr vacuum at 800° C. for one hour to remove residual solvent and to increase the adhesion of the nanotubes to the metal tip and the bonding between the nanotubes.

Figure 16:
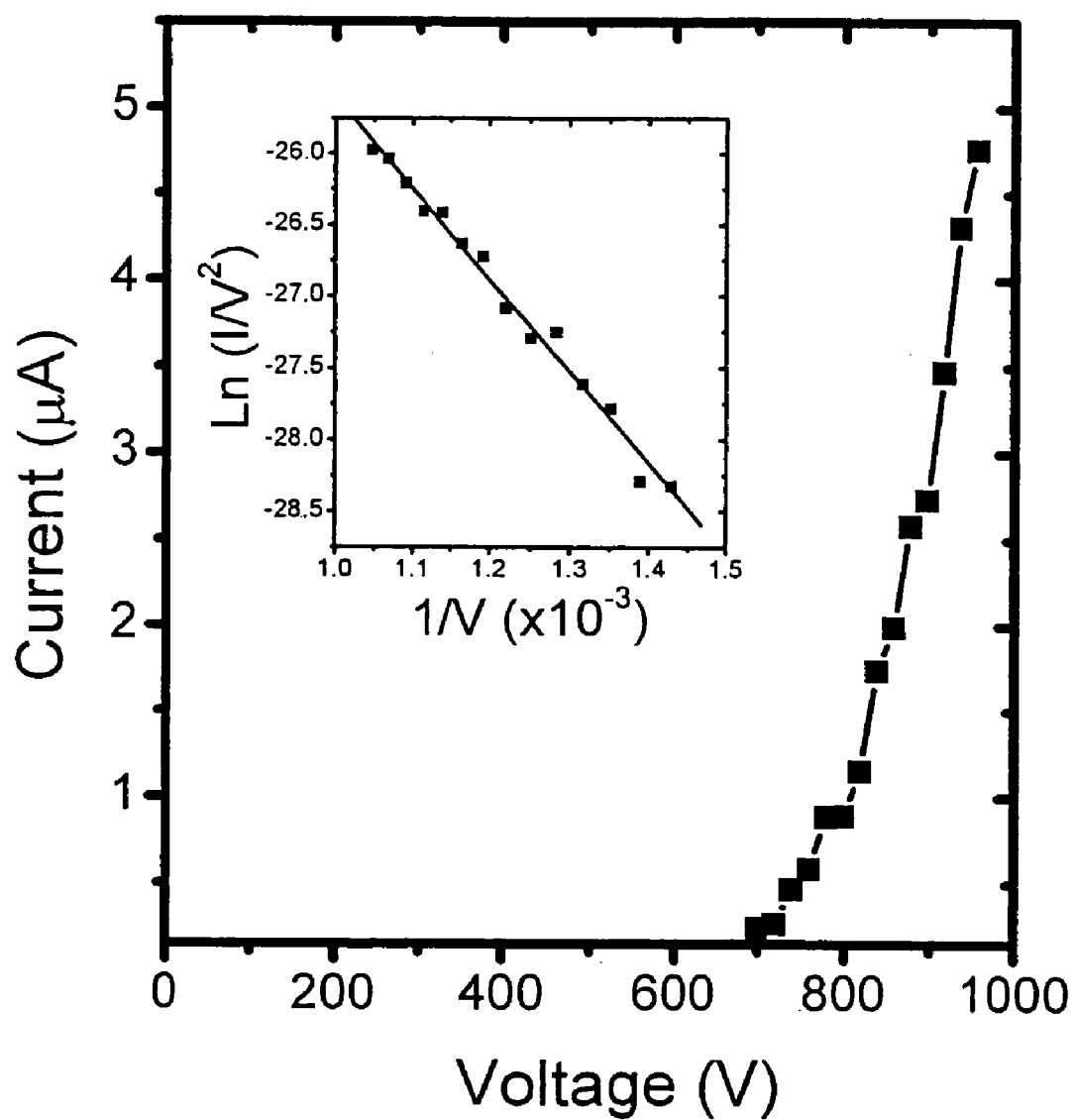
FIG. 16 is a plot of the emitted electron current vs. applied voltage for a device formed according to the present invention.
Figure 17:
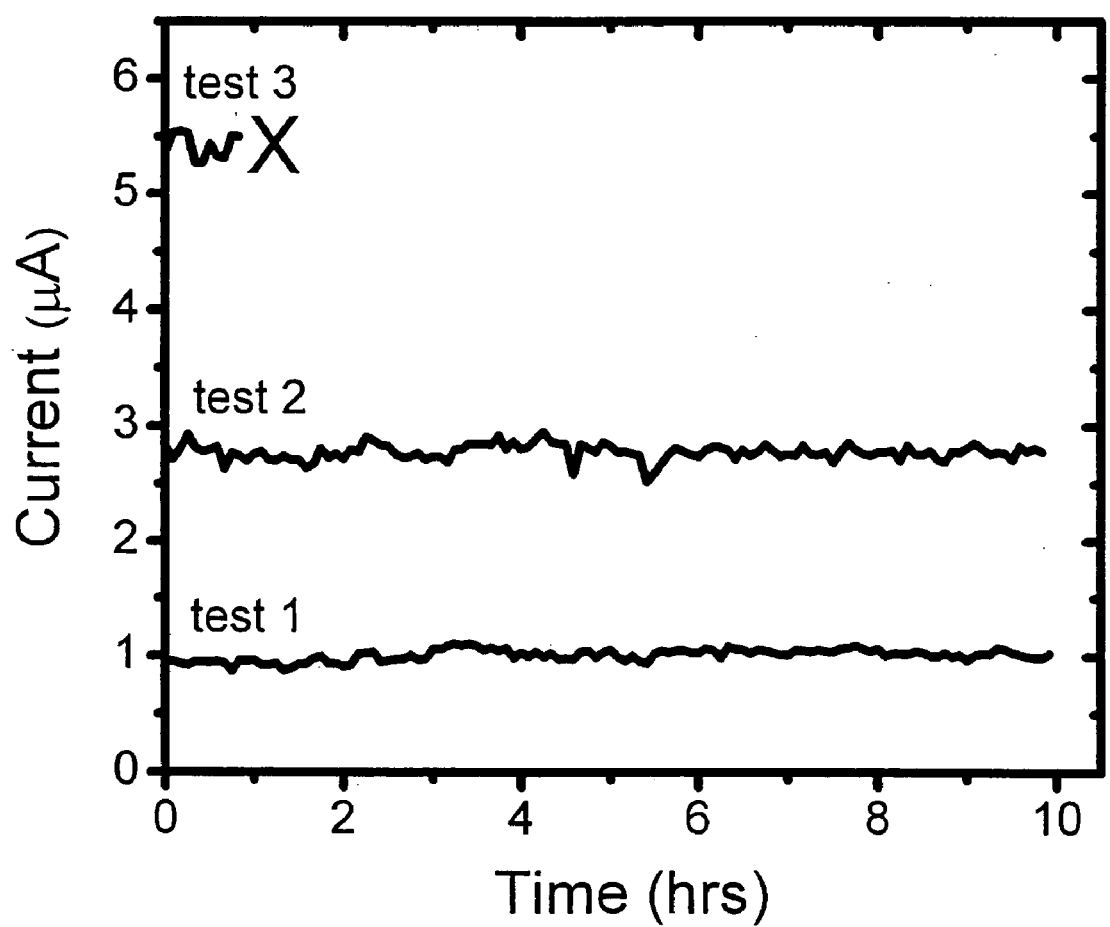
FIG. 17 is a plot of emitted electron current over time for a device formed according to the present invention.

The electron field emission characteristics of these tips were measured using pointplane geometry with a tip mounted on a micrometer head as the cathode and an opposing metal plate as the anode. The distance between the two was adjusted by translating the micrometer head and was fixed to ~200 mm. The set-up was placed inside a vacuum chamber at $5\times10^{-7}$ Torr base pressure. The total emission current from the tip was collected as a function of the applied voltage. FIG. 16 and inset show the data collected from a tip with a ~50 nm tip diameter. The emission current-voltage characteristics exhibited the classic Fowler-Nordheim type behavior with a linear relation between $\ln(I/V^2)$ and $1/V$. The emission current reached 5 mA at less than 1000 V applied voltage, which gives an estimated current density of $2.5\times10^5$ A/cm$^2$ The emission stability was measured by monitoring the variation of the emission current with time for 10 hours continuously in DC mode at a fixed voltage. FIG. 17 shows the data from a tip (~50 nm in diameter) measured sequentially at three different voltages. The emission current was stable at 1 mA and 2.8 mA when the applied voltage was fixed at 800 V and 1000 V, respectively, with no overall decay of the emission current. With a ballast resistor in series with the cathode, the local current fluctuation was calculated to be 5% at 1 mA and 2.5% at 2.8 mA. The emission current from the same sample reached 5.5 mA when the voltage was further increased to 1200 V, but was then suddenly dropped to zero after one hour. No current was detected even at a higher voltage. SEM examinations revealed catastrophic failure from fracture of the W wire and disappearance of the entire tip as shown in FIG. 17. This is attributed to resistive heating at the W and fibril interface. In another prepared tip, a stable current of 6.5 mA was obtained. The current fluctuation of this sample without the ballast resistor was about 12%, comparable to value reported from an un-ballasted individual single-wall carbon nanotube.

Figure 18:
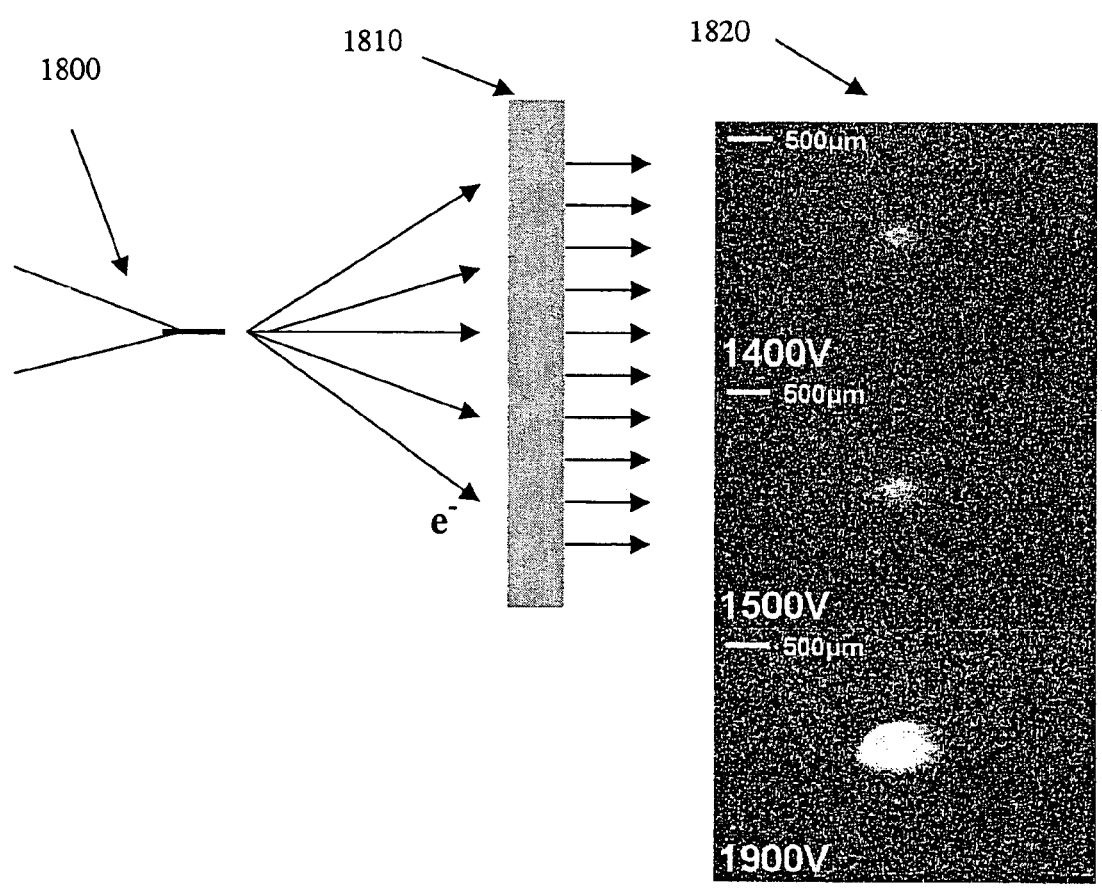
FIG. 18 is an illustration of a point electron field emission source and emission pattern for a device formed according to the present invention.

As illustrated in FIG. 18, to record the emission pattern from the tip 1800, the metal anode used in the above measurements was replaced with a phosphor-coated ITO (indium-tin-oxide) glass 1810. The image 1820 formed on the phosphor screen by the emitted electrons was recorded by a CCD camera placed outside the vacuum chamber. The emission images 1820 were obtained from a multi-walled nanotube/tip. A single emission spot was observed in all operating voltages, consistent with the SEM results which showed that there is only one close-packed carbon nanotube anchored on each tungsten tip. At 1400 V the diameter of the bright spot on the phosphor screen is about 200 mm giving a beam divergence angle of 50°. The large spread angle results from the electrical field distribution in the point-plane geometry rather than the intrinsic divergence angle of the field-emitted electrons from the nanotubes.

While the present invention has been described by reference to the above-mentioned embodiments, certain modifications and variations will be evident to those of ordinary skill in the art. Therefore, the present invention is limited only by the scope and spirit of the appended claims.

What is claimed is:

1. A method of separating materials containing at least one of nanotubes and nanowires with different electronic properties into separate groups wherein each group contains materials with similar electronic properties, the method comprising:
   (i) suspending the materials to be separated in a liquid medium;
   (ii) introducing a plurality of electrodes into the suspension, the plurality of electrodes including at least a first electrode and a second electrode, the first electrode having a different geometry from the second electrode;
   (iii) establishing an asymmetrical alternating-current (AC) electrical field within the mixture between the first electrode and the second electrode;
   (iv) adjusting the frequency of the AC field to a suitable value to cause at least a first group of materials with one type of electronic properties to migrate to the first electrode and causing a second group of materials with a different type of electronic properties to migrate to the second electrode; and
   (v) recovering at least the first group from the liquid medium at the first electrode.

2. The method of claim 1, wherein step (v) further comprises recovering the second group from the liquid medium at the second electrode.

3. The method of claim 1, wherein the first group comprises conductors and the second group comprises semiconductors.

4. The method of claim 3, wherein the conductors comprise metallic carbon nanotubes and the semiconductors comprise semiconducting carbon nanotubes.

5. The method of claim 1, wherein the liquid medium comprises water.

6. The method of claim 1, further comprising adjusting the dielectric constant of the liquid medium.

7. The method of claim 1, wherein the materials to be separated comprise a mixture of metallic and semiconducting carbon nanotubes.

8. The method of claim 1, wherein the first electrode has a sharp protrusion and the second electrode has a planar geometry.

* * * * *